United States Patent
Ho

(10) Patent No.: US 9,253,110 B2
(45) Date of Patent: Feb. 2, 2016

(54) BEST-EFFORT SCHEDULED ACCESS

(75) Inventor: Jin-Meng Ho, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/327,631

(22) Filed: Dec. 15, 2011

(65) Prior Publication Data

US 2012/0155279 A1  Jun. 21, 2012

Related U.S. Application Data

(60) Provisional application No. 61/423,696, filed on Dec. 16, 2010.

(51) Int. Cl.
*H04L 12/873* (2013.01)
*H04W 72/04* (2009.01)
*H04W 74/06* (2009.01)
*H04W 74/08* (2009.01)

(52) U.S. Cl.
CPC ......... *H04L 47/522* (2013.01); *H04W 72/0406* (2013.01); *H04W 72/048* (2013.01); *H04W 74/06* (2013.01); *H04W 74/0808* (2013.01)

(58) Field of Classification Search
USPC ......... 370/229–236, 252, 276–278, 282, 294, 370/345–350, 449–463
See application file for complete search history.

(56) References Cited

U.S. PATENT DOCUMENTS

| | | | |
|---|---|---|---|
| 2006/0050742 A1* | 3/2006 | Grandhi et al. | 370/506 |
| 2009/0122768 A1* | 5/2009 | Nakashima et al. | 370/338 |
| 2010/0157961 A1* | 6/2010 | Ji et al. | 370/338 |

* cited by examiner

*Primary Examiner* — Michael Thier
*Assistant Examiner* — Eric Myers
(74) *Attorney, Agent, or Firm* — Ronald O. Neerings; Frank D. Cimino

(57) ABSTRACT

Embodiments of the invention provide a best-effort scheduled access method and system that enable nodes to request, and a hub to assign, tentative, but not committed, scheduled allocations, referred to as unscheduled bilink allocations, in which data traffic is transferred between the nodes and the hub on a best-effort basis. The tentative allocations will be available if the network of the hub still has enough bandwidth, but will be shifted or reduced otherwise. This invention unifies tentative and committed scheduled allocations in the same access framework, thereby facilitating access scheduling and offering access flexibility.

36 Claims, 16 Drawing Sheets

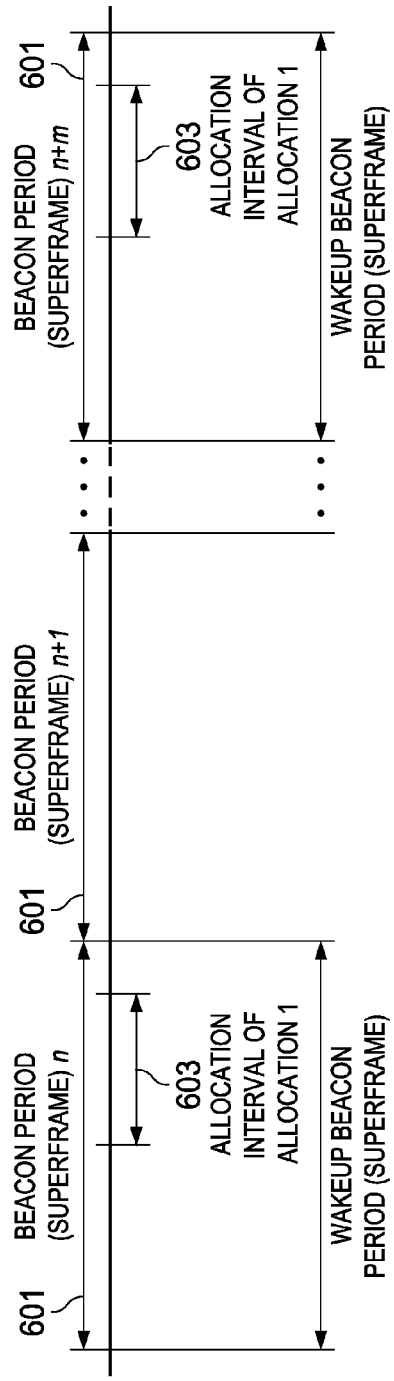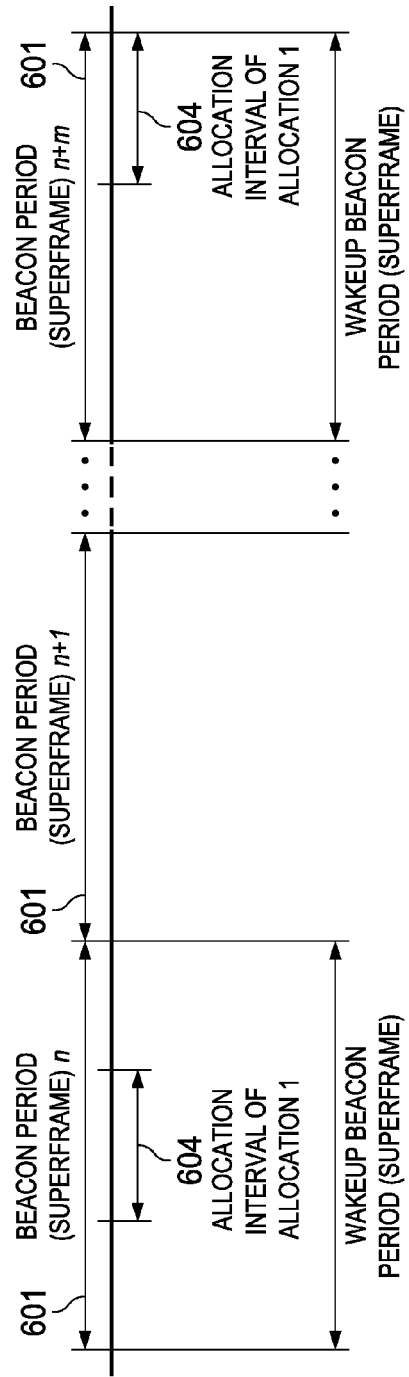

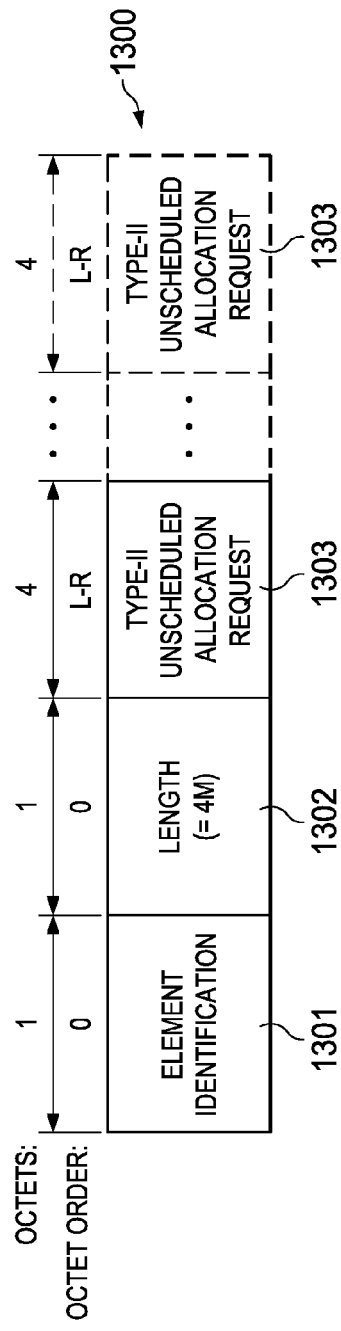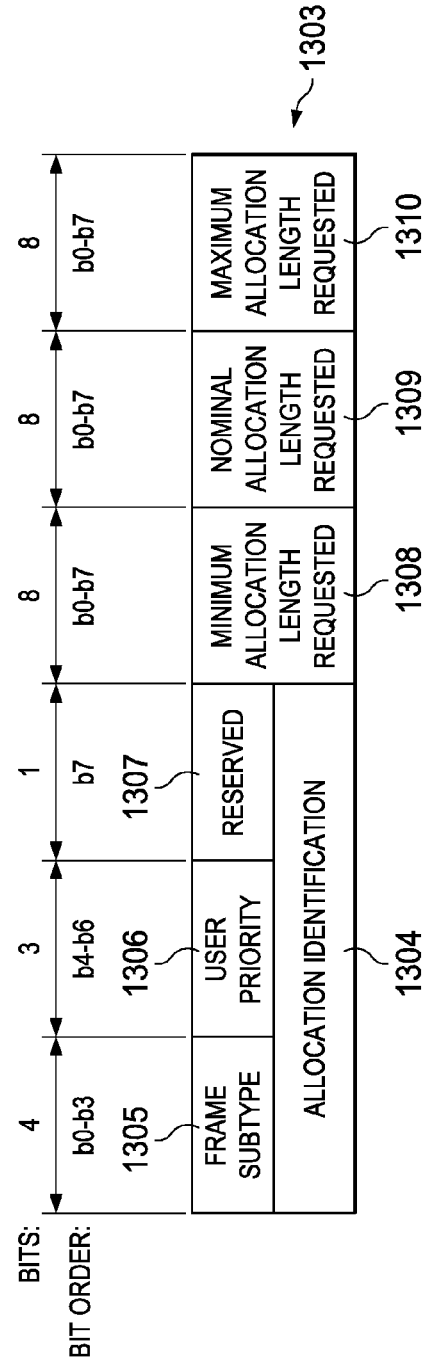

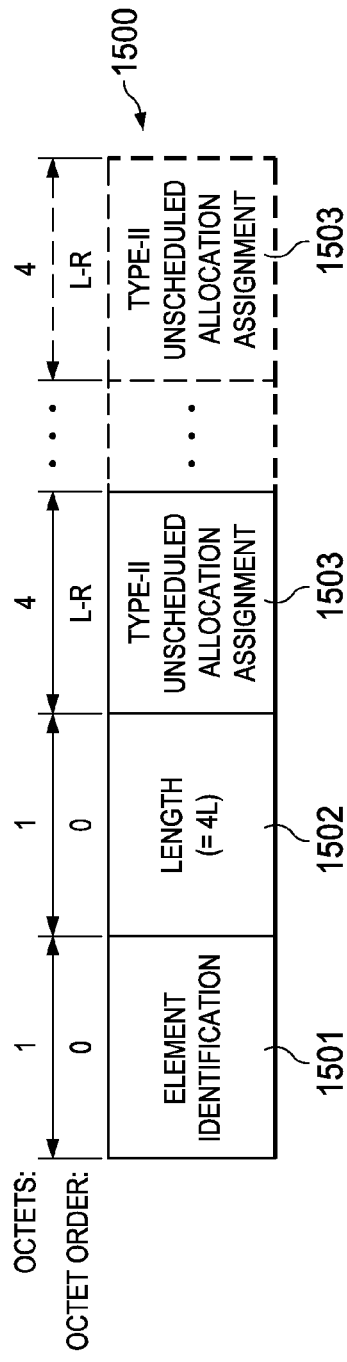
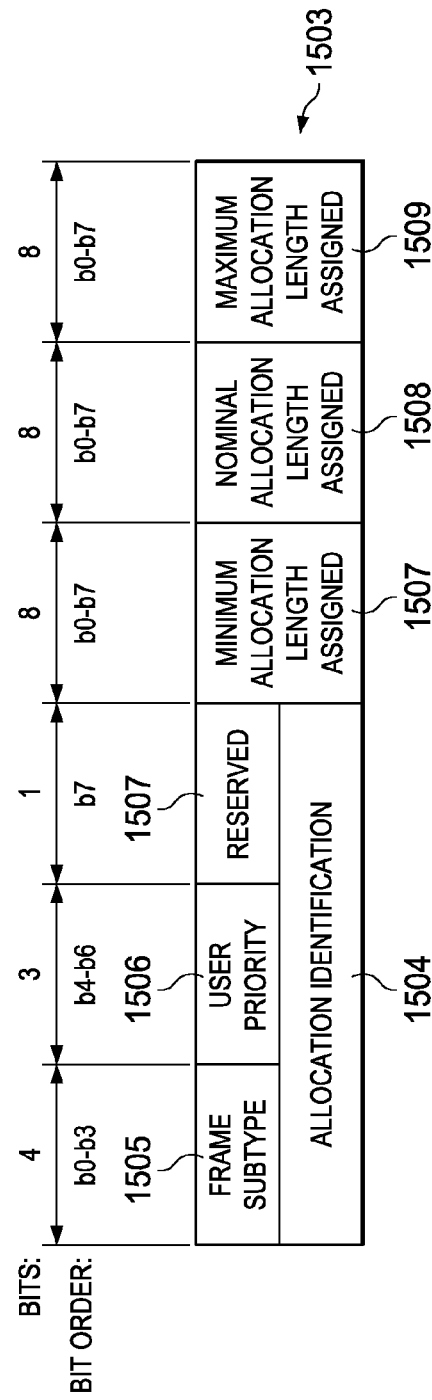
FIG. 15A
FIG. 15B

BEST-EFFORT SCHEDULED ACCESS

CROSS-REFERENCE TO RELATED APPLICATIONS

This application claims the benefit of the filing date of U.S. Provisional Patent Application No. 61/423,696, which is titled "Body Area Network (BAN) Coexistence through Active Superframe Interleaving," and filed Dec. 16, 2010, the disclosure of which is hereby incorporated by reference herein in its entirety.

TECHNICAL FIELD

Embodiments of the invention are directed, in general, to medium access methods and, more specifically, to providing flexible scheduled access to nodes and granting medium access to the nodes on a best-effort basis.

BACKGROUND

Existing networks do not allow nodes to request or allow a hub to grant best-effort scheduled access, wherein an allocation interval is scheduled for a node ahead of time and then granted on a best-efforts basis in real time. Instead, existing networks use strictly scheduled access intervals.

An example system for providing a unified framework of non-contention access methods, including scheduled, polled and posted access, and for providing different levels of tradeoffs between power consumption and strictly scheduled medium access for use in a Body Area Network (BAN) or in any other network or system, is described in U.S. patent application Ser. No. 12/697,105, filed Jan. 29, 2010, and titled "Access and Power Management for Centralized Networks" the disclosure of which is hereby incorporated in its entirety herein.

SUMMARY

Nodes may request, and a hub may provide, tentative, but not committed, scheduled allocations. These allocations are referred to herein as unscheduled bilink allocations, in which data traffic is transferred between the nodes and the hub on a best-effort basis. Such tentative allocations will be available if the network of the hub still has enough bandwidth when the scheduled time arrives, but will be shifted or reduced otherwise. The access method used to obtain unscheduled bilink allocations is referred to as best-effort scheduled access or, interchangeably, unscheduled access.

Embodiments of the invention provide flexible and simple allocation intervals to nodes in a network. A unified framework of non-contention access methods, including scheduled, polled and posted access, enables different levels of medium access. A node may use best-effort scheduled access for an allocation on a communication medium. The best-effort scheduled access may be a one-periodic (1-periodic) allocation in which an allocation interval reoccurs in every beacon period. The 1-periodic allocation is suitable for high-duty cycle periodic or quasi-periodic traffic. The best-effort scheduled access may also be a multi-periodic (m-periodic) allocation that reoccurs over a longer interval, such as every m beacon periods (where m>1). The m-periodic allocation is suitable for low duty cycle periodic or quasi-periodic traffic. The 1-periodic and m-periodic allocations may be used for bilink traffic. For the situation wherein multiple users require allocation intervals on the same channel or with the same hub, a round-robin allocation format may be used in which each node is assigned an allocation interval in turn.

A poll frame or data frame may be used by a hub to indicate if a node is allowed to use the earlier tentatively scheduled allocation interval. The hub sends the node a poll identifying a polled allocation that designates an interval in the actually granted best-effort scheduled allocation. The hub may provide the expected or scheduled allocation interval. Alternatively, the hub may designate an allocation interval that is shifted in time or reduced/expanded in duration. Once a polled allocation starts, the node may upload frames to be received and acknowledged by the hub.

BRIEF DESCRIPTION OF THE DRAWINGS

Figure 1:
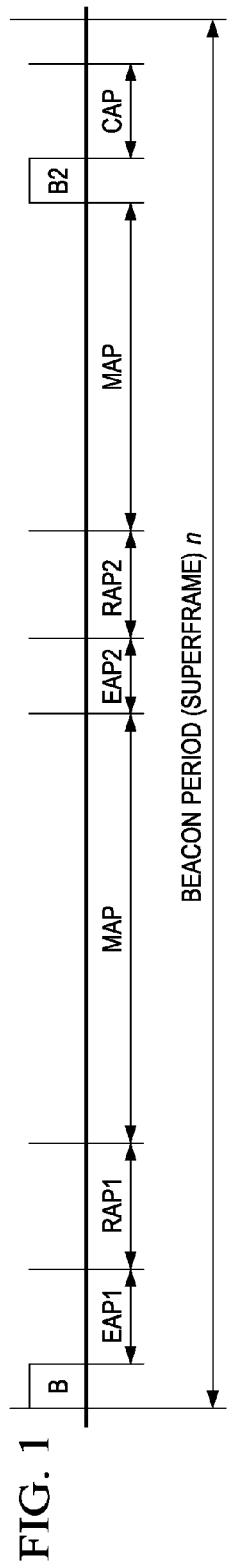
Figure 2:
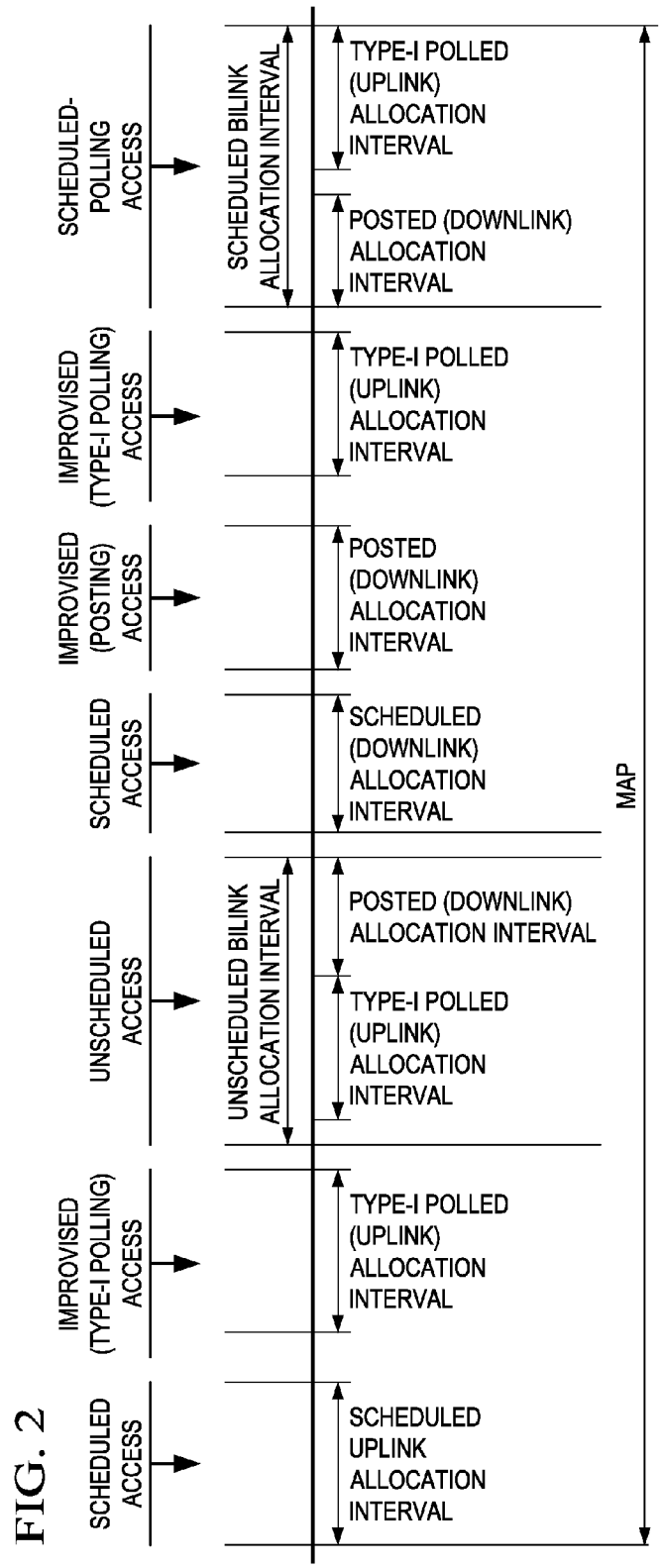
Figure 3:
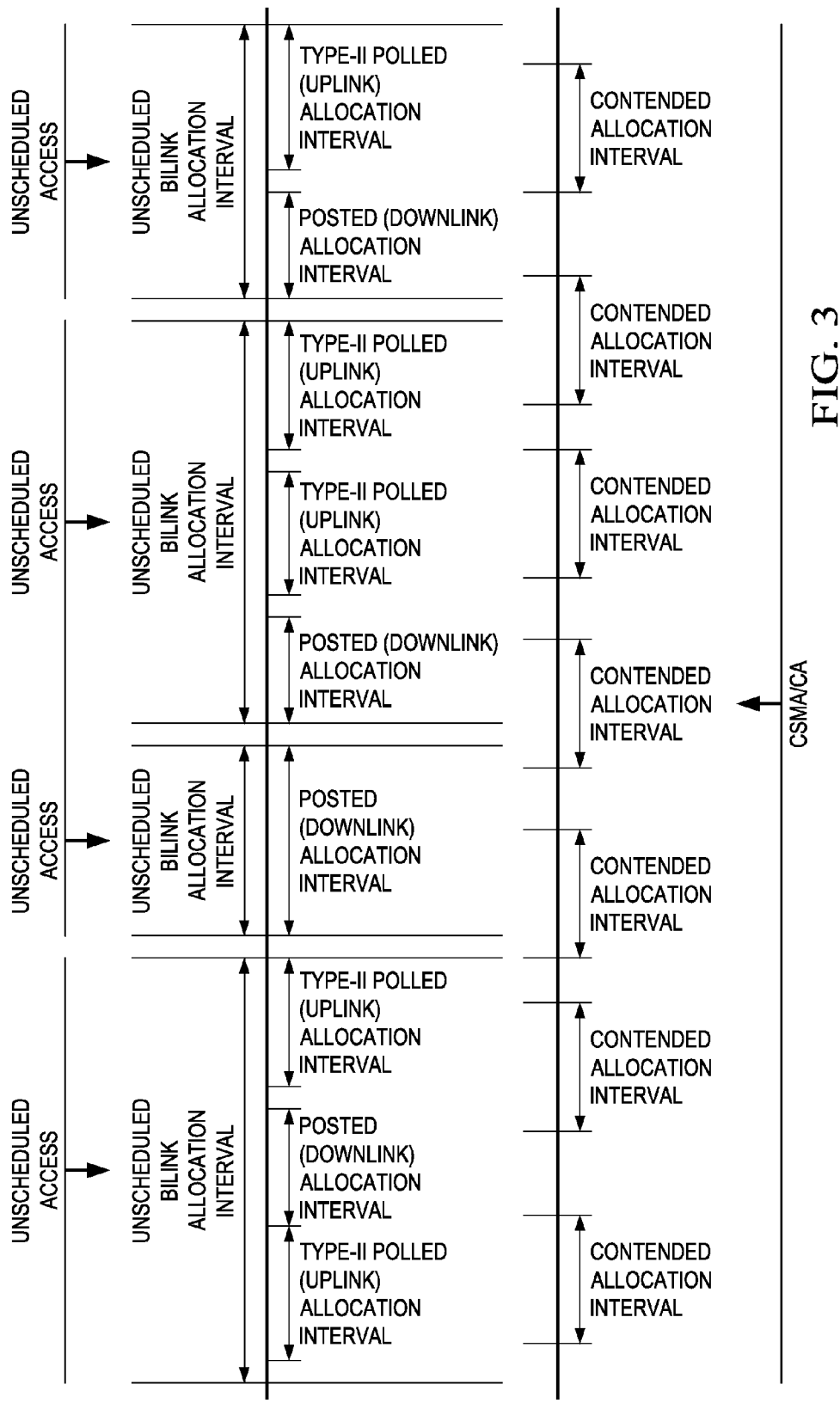
Figure 4A:
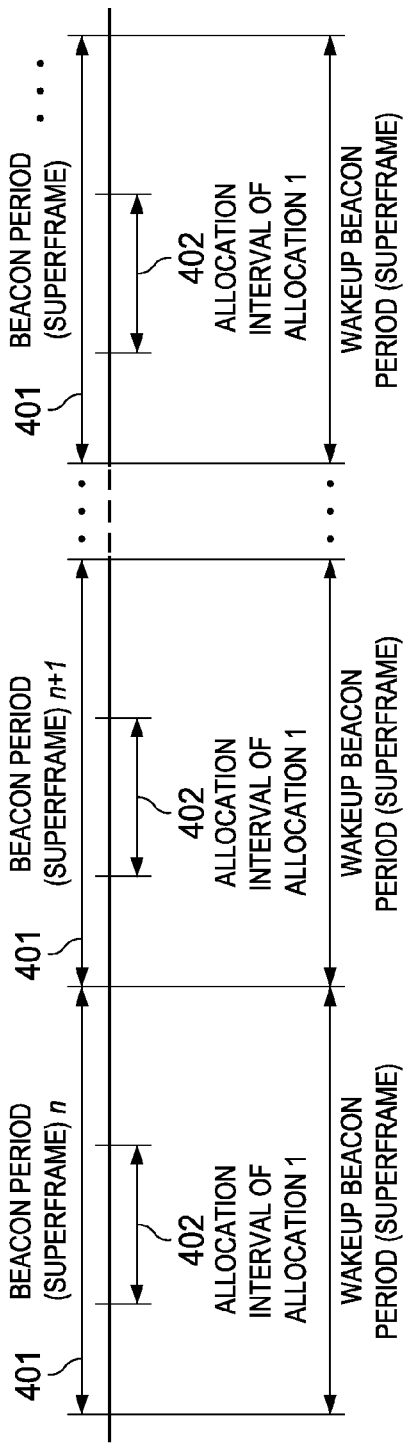
Figure 4B:
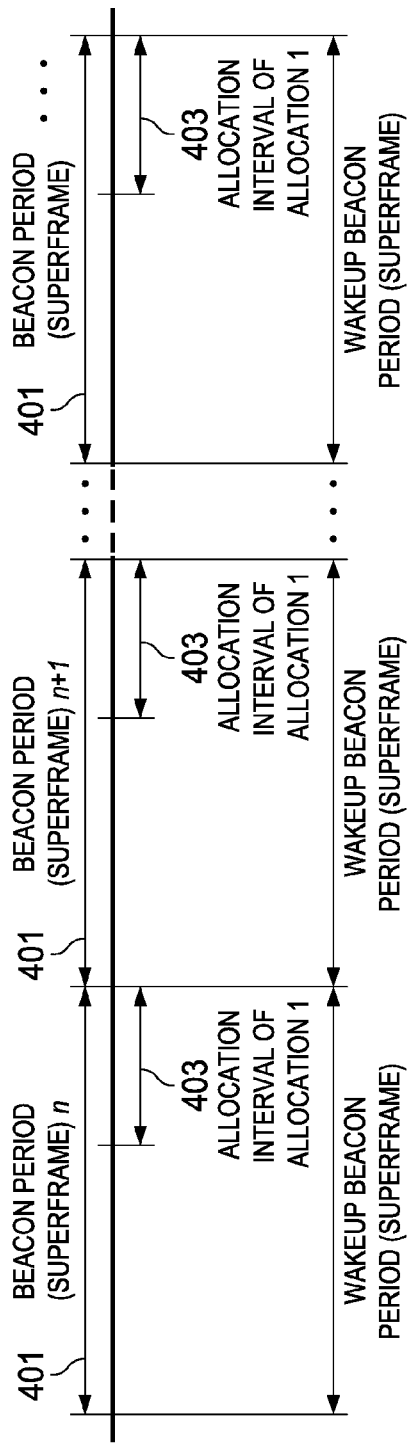
Figure 4C:
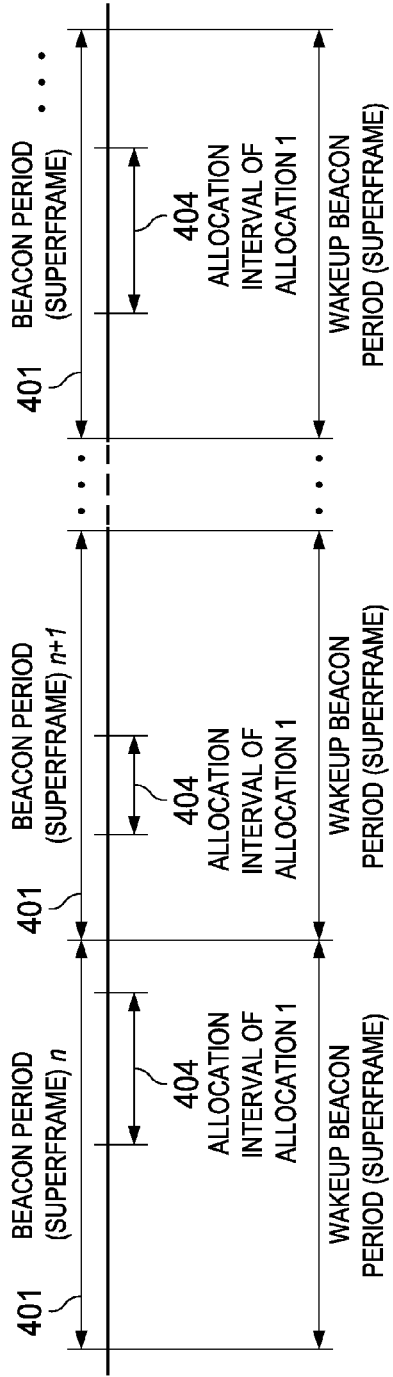
Figure 5A:
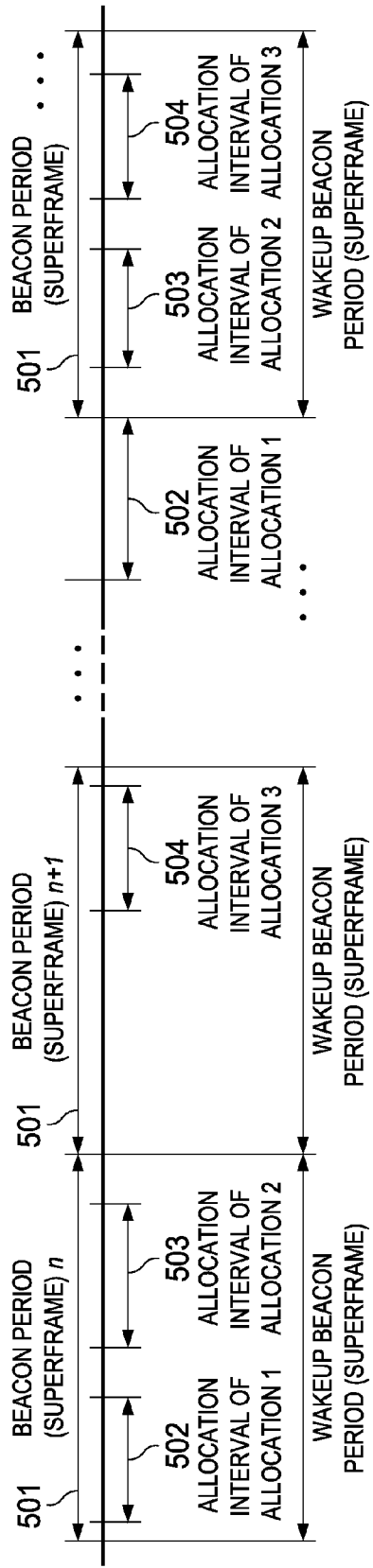
Figure 5B:
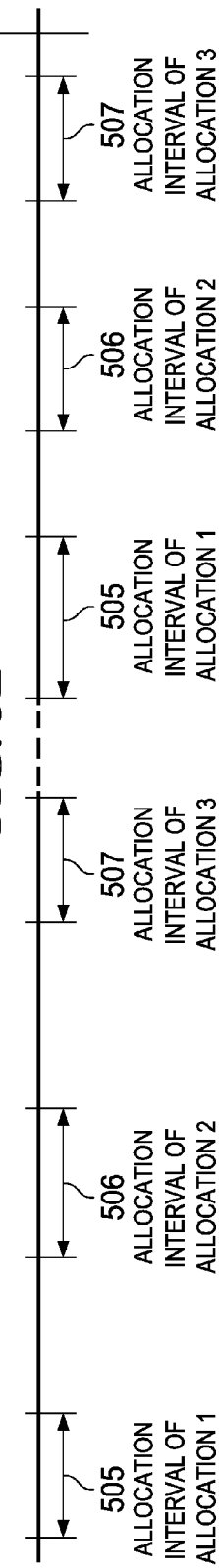
Figure 6A:
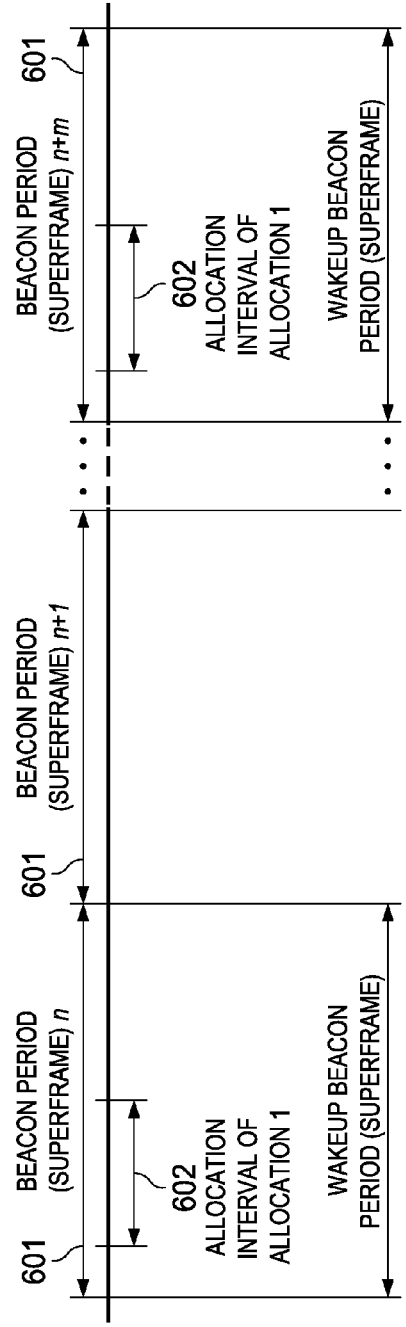
Figure 7:
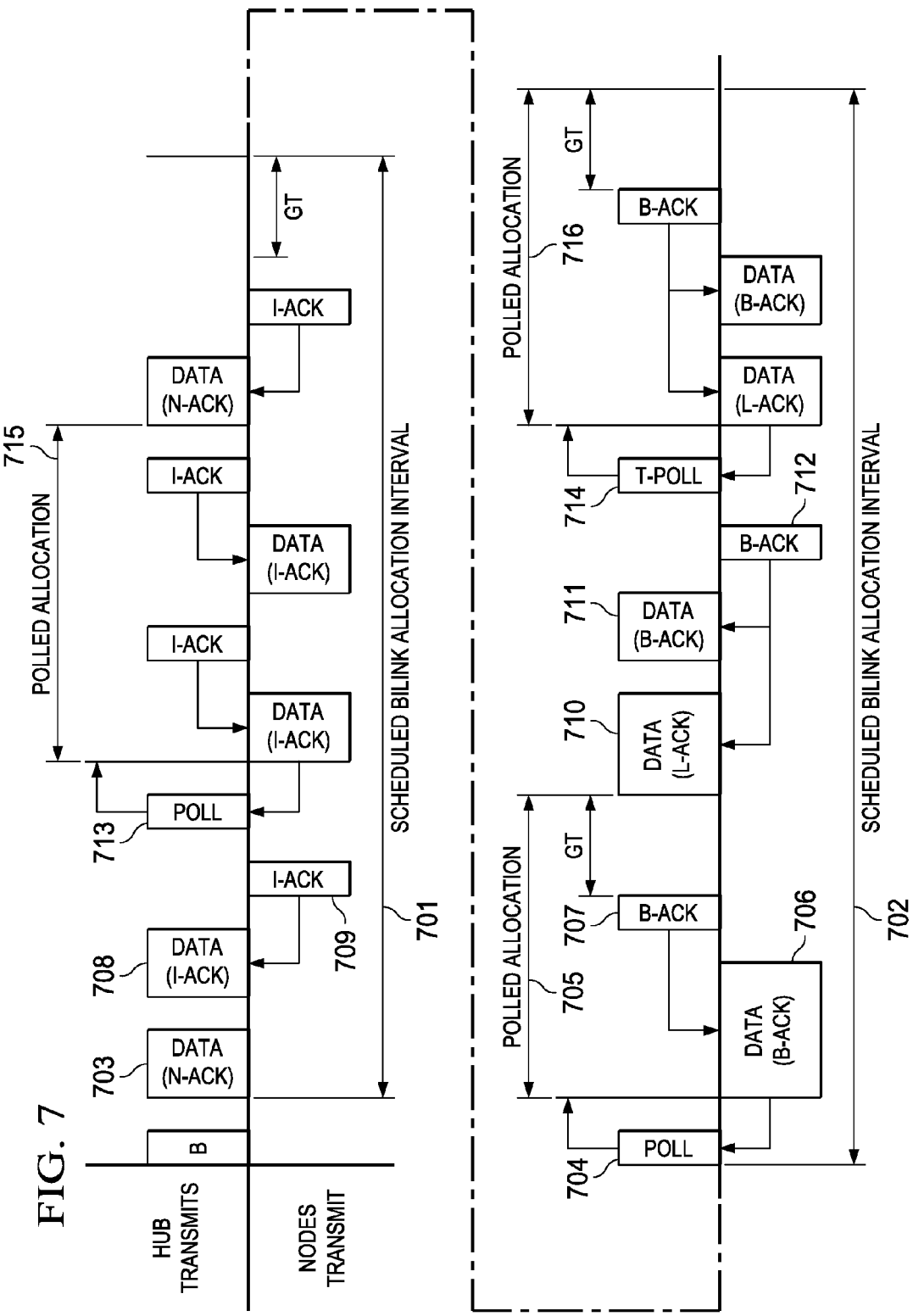
Figure 8:
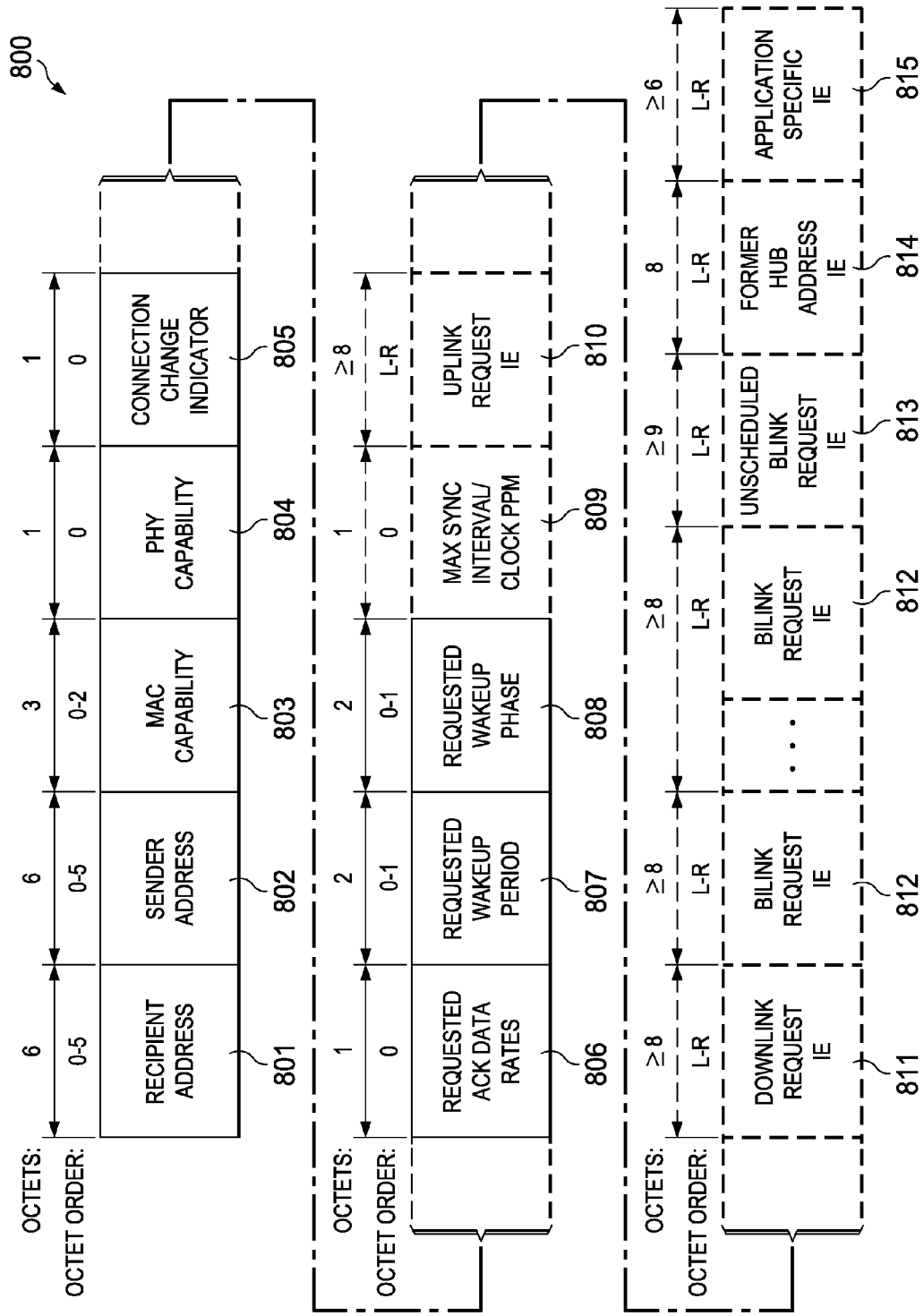
Figure 9:
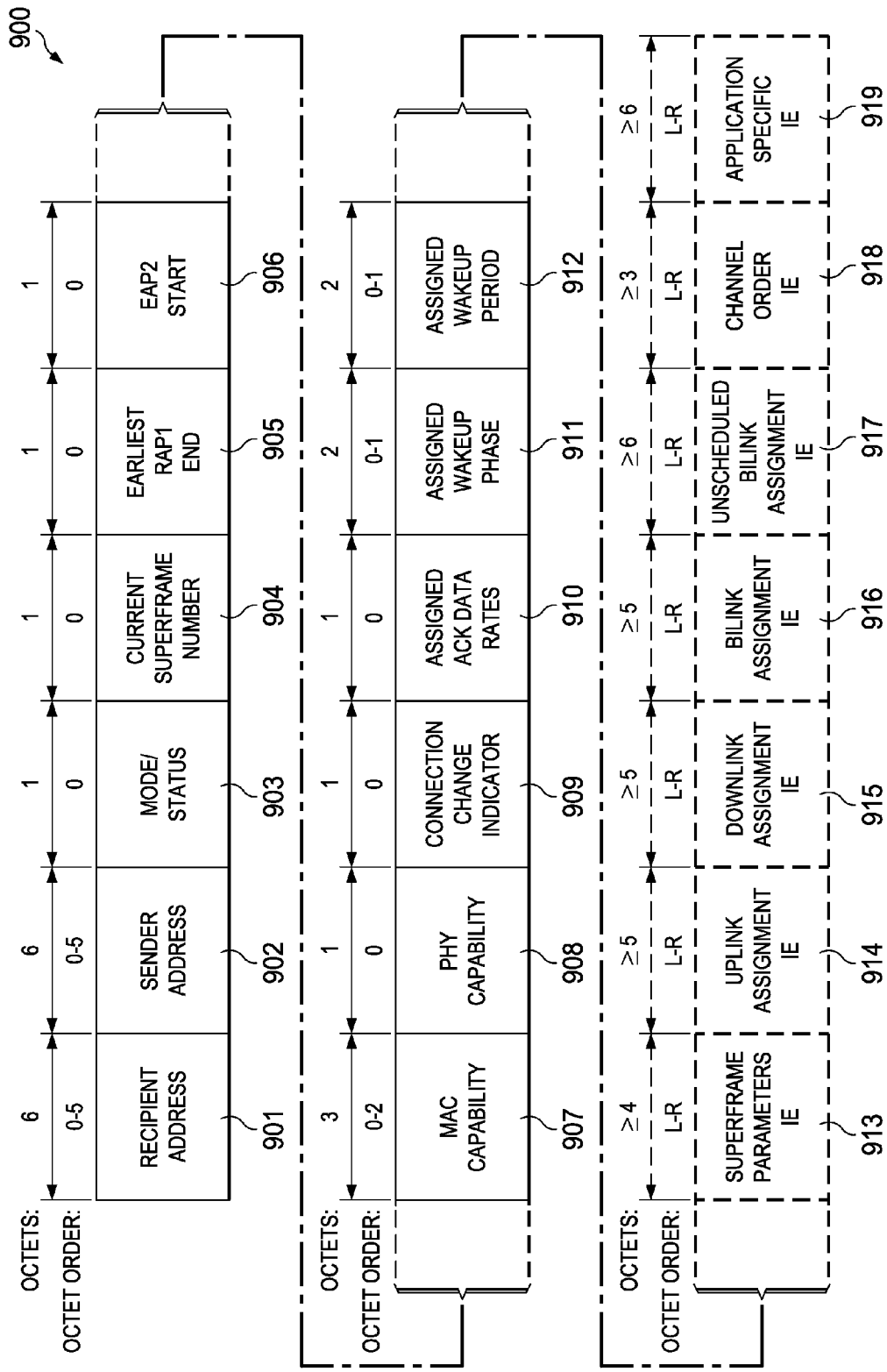
Figure 10:
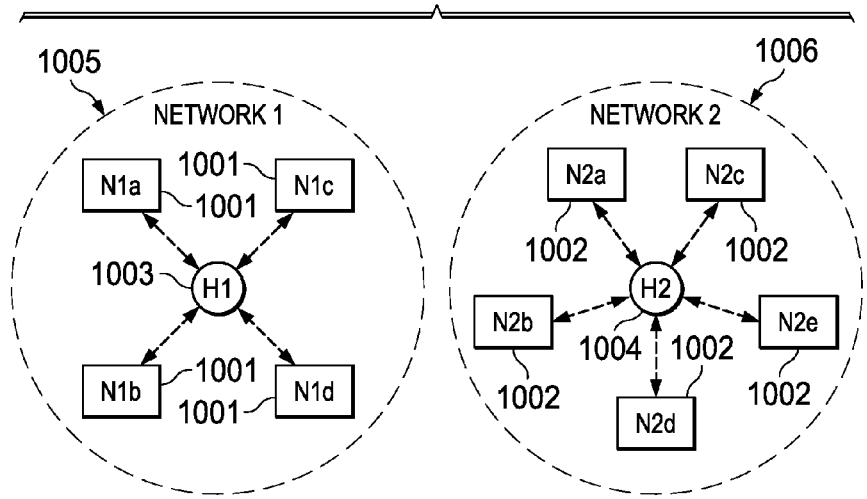
Figure 11:
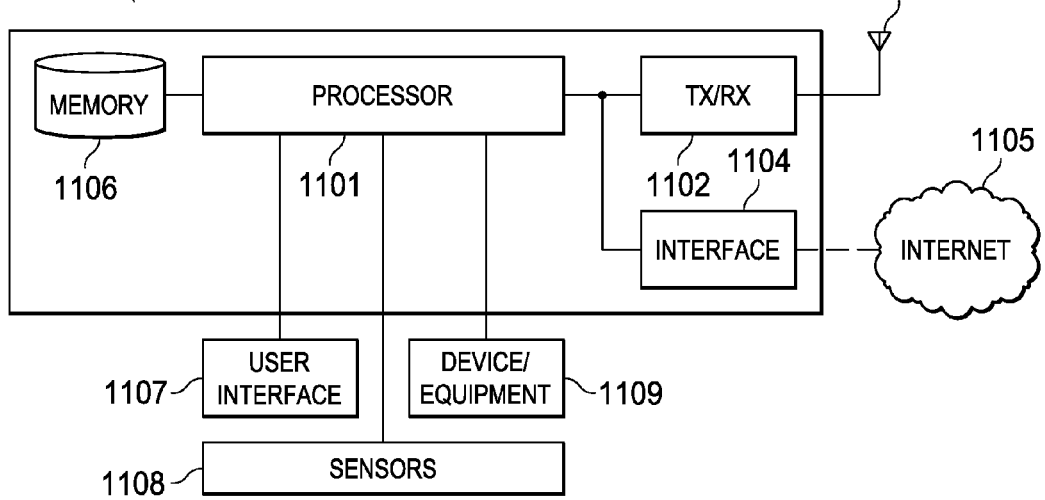
Figure 12A:
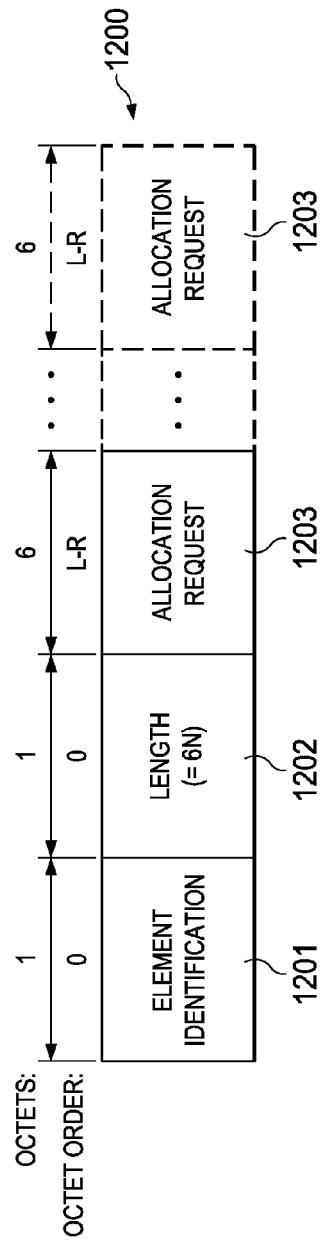
Figure 12B:
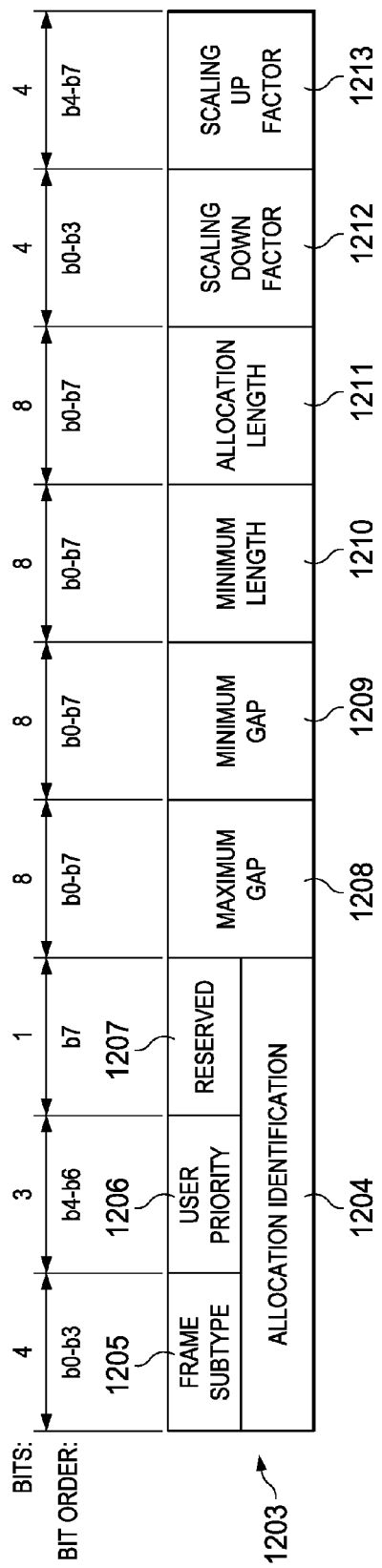
Figure 14A:
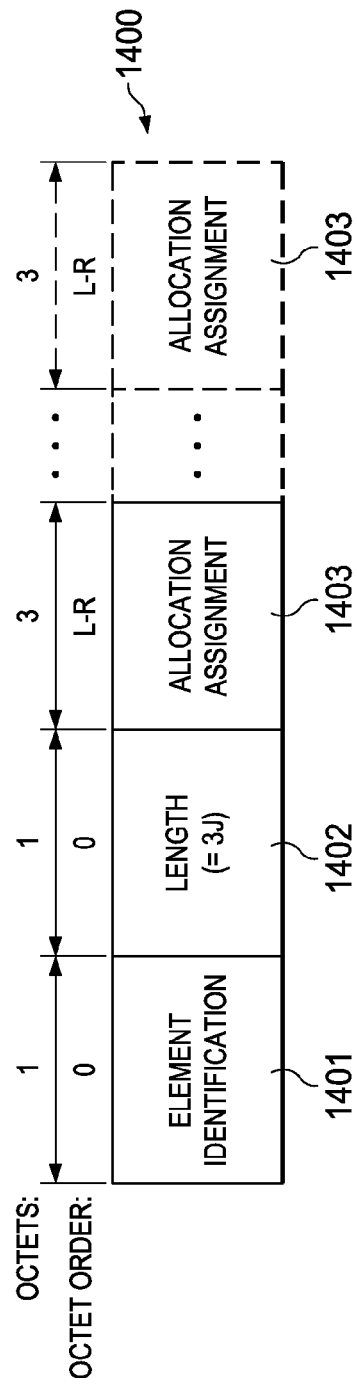
Figure 14B:
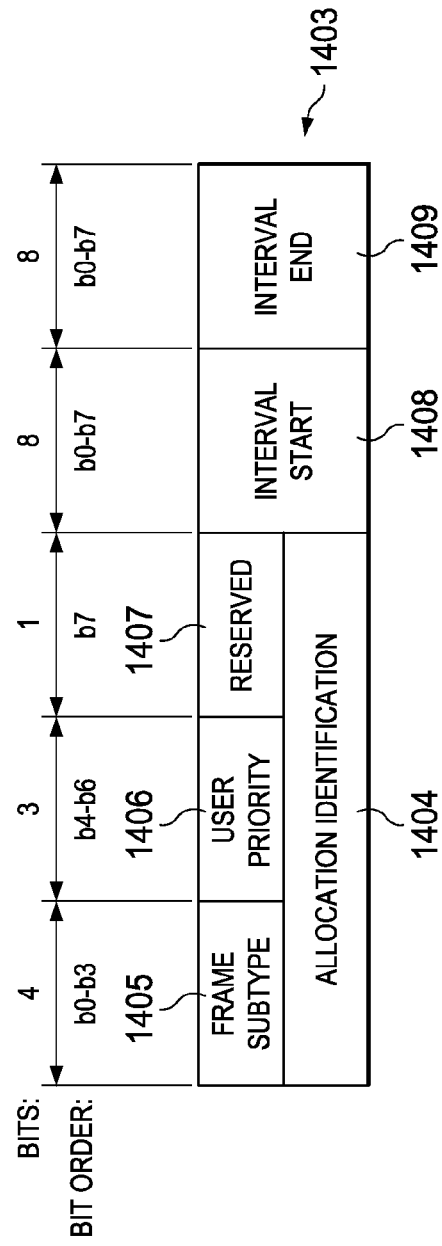
Figure 16:
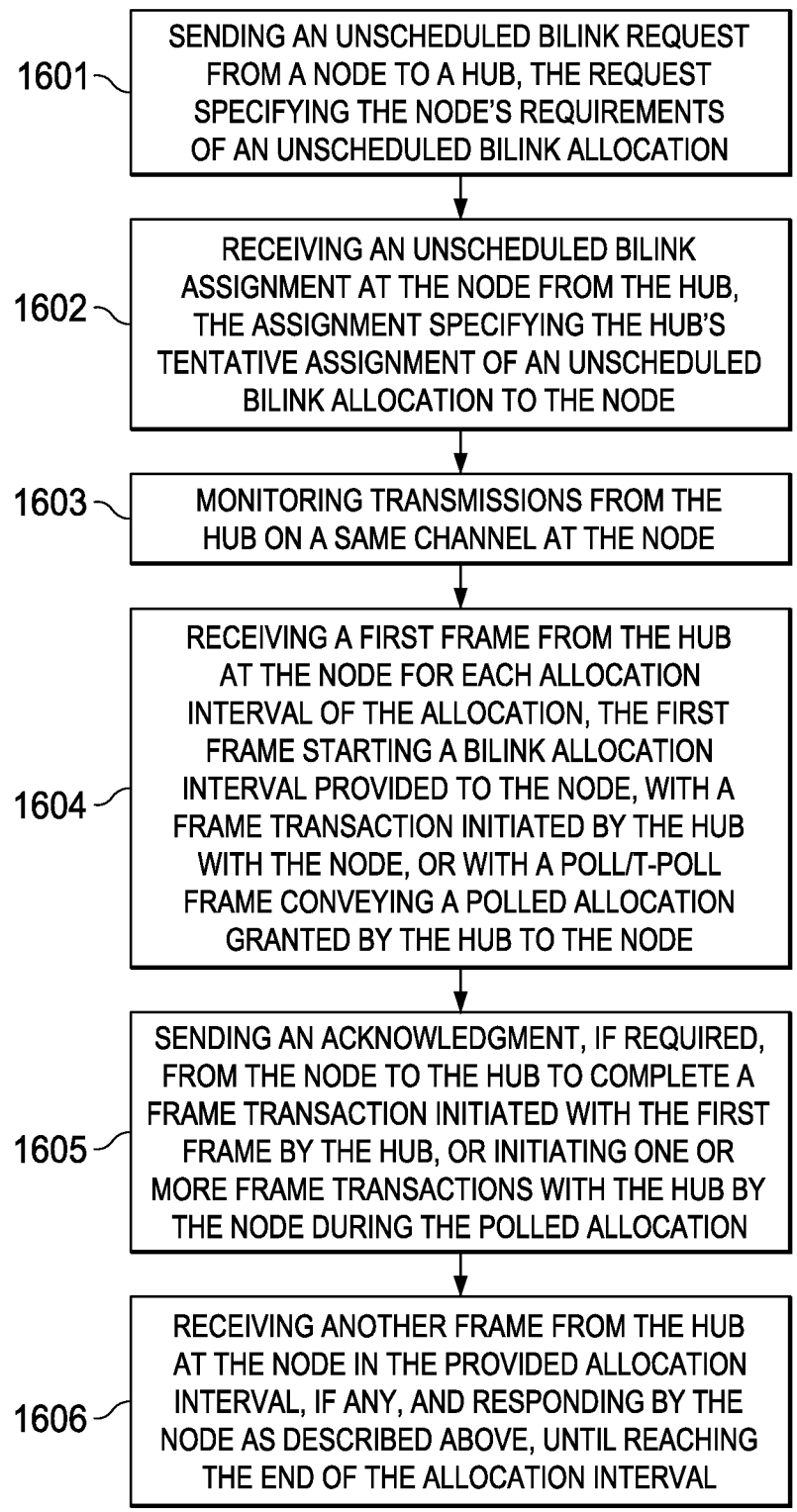
Figure 17:
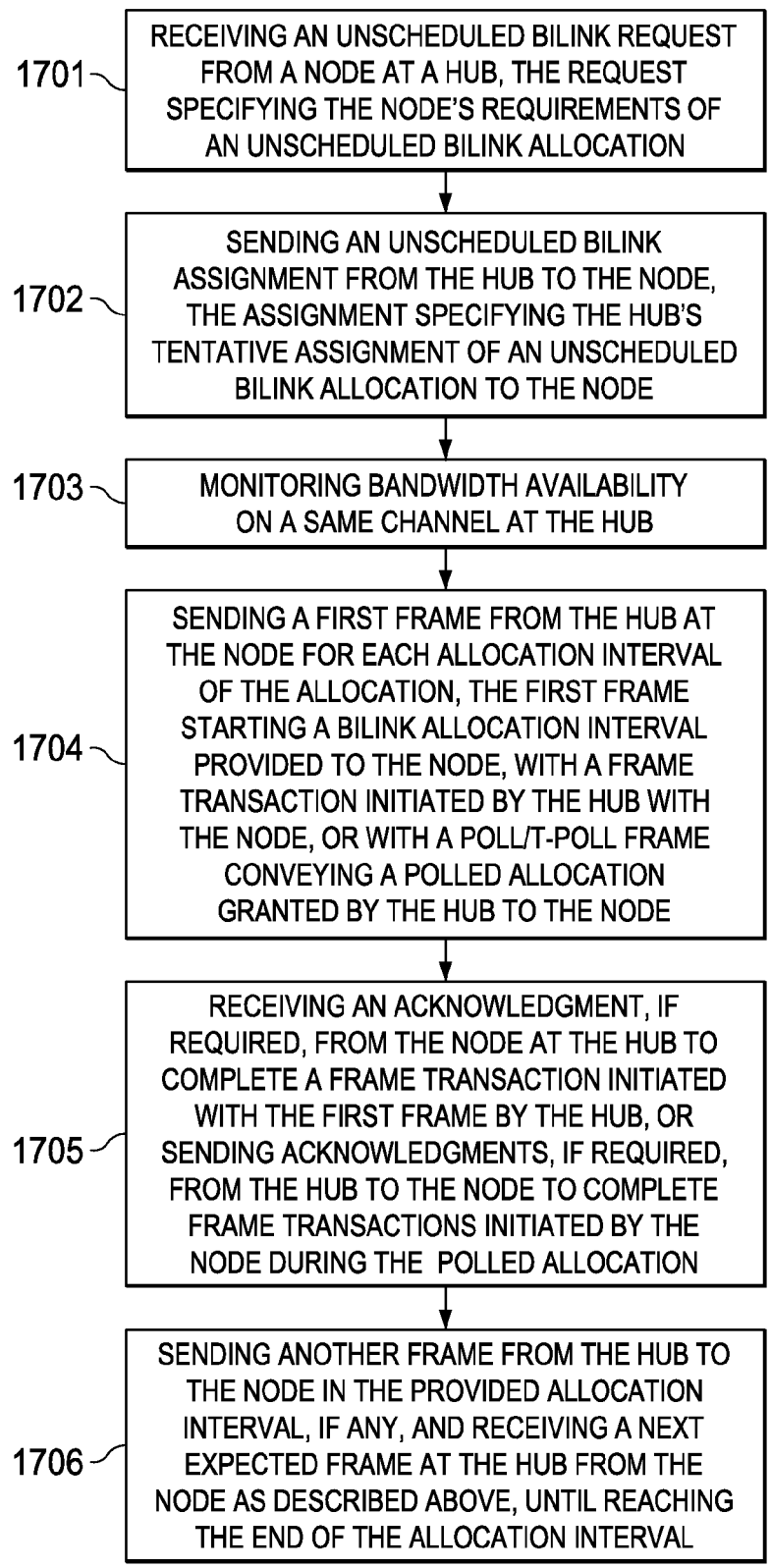

Having thus described the invention in general terms, reference will now be made to the accompanying drawings, wherein:

FIG. 1 illustrates an active beacon period organized with access phases;

FIG. 2 illustrates various allocation intervals along with the corresponding access methods whereby the allocation intervals are obtained in a managed access phase (MAP);

FIG. 3 illustrates unscheduled bilink allocation intervals comprising polled allocations and/or posted allocations in a non-beacon mode without superframes;

FIGS. 4A-4C illustrate 1-periodic unscheduled bilink allocations in beacon or non-beacon modes with superframes;

FIGS. 5A and 5B illustrate round-robin unscheduled bilink allocations for multiple nodes;

FIGS. 6A-6C illustrate m-periodic unscheduled bilink allocations in beacon or non-beacon mode with superframes;

FIG. 7 illustrates frame transactions in unscheduled bilink allocation intervals according to one embodiment;

FIG. 8 illustrates a format of a Frame Payload in a Connection Request frame transmitted by a node to request creation or modification of a connection with a hub according to one embodiment;

FIG. 9 illustrates a format of a Frame Payload in a Connection Assignment frame transmitted by a hub to respond to a connection request or to initiate or change a connection assignment according to one embodiment;

FIG. 10 is a block diagram illustrating a network topology employing embodiments of the invention;

FIG. 11 is a block diagram of an exemplary embodiment of a device implementing embodiments of the invention;

FIGS. 12A and 12B illustrate a format of a Type-I Unscheduled Bilink Request IE according to one embodiment;

FIGS. 13A and 13B illustrate a format of a Type-II Unscheduled Bilink Request IE according to one embodiment;

FIGS. 14A and 14B illustrate a format of a Type-I Unscheduled Bilink Assignment IE according to one embodiment;

FIGS. 15A and 15B illustrate the format of a Type-II Unscheduled Bilink Assignment IE according to one embodiment;

FIG. 16 is a flowchart illustrating a process for performing a best-effort scheduled access by a node according to one embodiment; and FIG. 17 is a flowchart illustrating a process for performing a best-effort scheduled access by a hub according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In a network comprising a hub and one or more nodes, various access methods may be used to obtain an allocation interval for initiating frame transactions between the nodes and the hub. In one embodiment, an unscheduled access may be used. An unscheduled access is a combination of best-effort scheduled access and polling and posted access. In an unscheduled access, a node and a hub obtain unscheduled, reoccurring time-intervals. The hub then grants to the node or to itself non-reoccurring time intervals for initiating frame transactions in an uplink, downlink, or both (called bilink). A frame transaction comprises a management or data type frame and an acknowledgment frame that follows, if an acknowledgment is required. In an uplink, the node sends management and/or data type frames to the hub, but not the other way around. In a downlink, the hub sends management and/or data type frames to the node, but not the other way around. In a bilink, the node sends management and/or data type frames to the hub, and/or vice versa.

In one embodiment, the hub and one or more nodes may be used in a Body Area Network (BAN) using the procedures described in the document identified as IEEE P802. 15.6/D06 and titled "Draft standard for Local and Metropolitan area networks—Part 15.6: Wireless Body Area Networks," published in November 2011 by the Institute of Electrical and Electronics Engineers, Inc., the disclosure of which is hereby incorporated herein by reference in its entirety.

A hub and a node that support unscheduled access may employ unscheduled access to initiate frame transactions in a downlink and/or uplink on a best-effort basis. Support for unscheduled access may be indicated in an exchanged MAC Capability field. Connection Request and Connection Assignment frames may be used to provide advance reservations and tentative allocation interval assignments. To support unscheduled access in beacon or non-beacon mode with superframes, a node shall be always active during time intervals wherein polls and posts are allowed to be sent.

An allocation between a node and a hub may be a bilink, which is a communications link for transfer of management and data traffic from a hub to a node and/or from a node to a hub. In an unscheduled bilink allocation, a node and a hub obtain one or more unscheduled, reoccurring time-intervals using unscheduled access. The unscheduled bilink allocation is then used to initiate frame transactions. In one embodiment, an unscheduled bilink allocation is suitable for servicing high or low duty cycle periodic or quasi-periodic traffic in an uplink and/or downlink on a best-effort basis.

According to one embodiment of unscheduled access, a node requests an unscheduled allocation, and the hub may then assign a tentatively scheduled allocation. A scheduled or unscheduled allocation comprises reoccurring allocation intervals. A node or a hub may indicate that it supports unscheduled access in its MAC Capability field or in some other manner. If they both support unscheduled access, then they may employ unscheduled access to obtain unscheduled bilink allocations and polled and posted allocations therein for best-effort traffic transfer between them. To effect an assigned allocation, the hub sends to the node a poll or a data frame. For example, a poll from the hub will tell the node how much time the node is actually granted for the upcoming allocation interval and whether the allocation interval is offset in time from the expected allocation. However, if a higher priority user or event requires the channel during the assigned allocation interval, then the hub may grant the node channel access outside that allocation interval.

A hub may operate in one of three access modes: beacon mode with beacon periods (superframes), non-beacon mode with superframes, or non-beacon mode without superframes. It will be understood that the terms beacon periods and superframes are interchangeable as used herein.

To provide or support time-referenced allocations in its network, a hub may establish a time base that divides the time axis into beacon periods regardless of whether the hub is going to transmit beacons. The hub may transmit a beacon in each beacon period, except in inactive superframes, or may not transmit a beacon in any beacon period. The hub may shift or rotate its beacon transmission time so that it uses one offset from the start of a current beacon period and another offset from the start of next beacon period. This has the effect of shifting the time reference for all scheduled allocations, which may prevent large-scale repeated transmission collisions between the hub's network and its neighbor networks.

In cases where a hub does not provide or support time referenced allocations in its network, the hub may operate without a time base or superframes and, therefore, without transmitting beacons at all.

A hub may operate in beacon mode transmitting a beacon in every beacon period—other than in inactive superframes—to enable time referenced allocations. The hub may operate in non-beacon mode transmitting no beacons, with superframes and allocation slots, established if access to the medium in its network involves time referencing; or the hub may operate without superframes or allocation slots if access to the medium in its network involves no time referencing.

In the beacon mode with beacon periods, the hub organizes applicable access phases in each active beacon period as illustrated in FIG. 1. The hub may maintain a number of inactive superframes after each active superframe (beacon period), if there are no allocation intervals scheduled in the inactive superframes. In an active superframe, a hub may transmit a beacon (B) and provide access phases. In an inactive superframe, the hub neither transmits any beacon nor provides any access phases.

The hub places access phases—exclusive access phase 1 (EAP1), random access phase 1 (RAP1), managed access phase (MAP), exclusive access phase 2 (EAP2), random access phase 2 (RAP2), another managed access phase (MAP), and contention access phase (CAP)—in the order illustrated in FIG. 1. The hub may set the length of any of these access phases to zero, but shall not have RAP1 end before the guaranteed earliest time as communicated in a Connection Assignment frame sent to nodes that are still connected with the hub. To provide a non-zero length CAP, the hub transmits a preceding B2 frame. The hub does not transmit a B2 frame if the CAP that follows has a zero length, unless, for example, it needs to announce B2-aided time sharing information and/or provide group acknowledgment.

In one embodiment, a node may obtain, and initiate frame transactions, in contended allocations in EAP1, RAP1, EAP2, RAP2, and CAP in any active superframe using carrier sense multiple access with collision avoidance (CSMA/CA) or slotted Aloha based random access.

In one embodiment, only in a MAP, as shown in FIG. 1, may the hub arrange scheduled uplink allocation intervals, scheduled downlink allocation intervals, and scheduled bilink allocation intervals; provide unscheduled bilink allocation intervals; and improvise certain immediate polled allocation intervals and posted allocation intervals starting in this MAP.

In an EAP, RAP, CAP, or MAP, the hub may also improvise future polls or posts starting and ending in a MAP such as through Poll, T-Poll, I-Ack+Poll, and B-Ack+Poll frames. An I-Ack+Poll frame is transmitted by a hub to acknowledge receipt of the preceding frame and to send a poll to the addressed node. An I-Ack+Poll frame is equivalent in function to an I-Ack frame followed by a Poll or T-Poll frame. A B-Ack+Poll frame is transmitted by a hub to acknowledge the reception status of certain preceding data type frames and to send a poll to the addressed node.

FIG. 2 illustrates various allocation intervals along with the corresponding access methods whereby the allocation intervals are obtained in a MAP.

In a non-beacon mode with superframes, a hub may have only a MAP in any superframe (beacon period) according to one embodiment.

In a non-beacon mode without superframes, a hub may provide unscheduled bilink allocation intervals comprising polled allocations and/or posted allocations as illustrated in FIG. 3. After determining that the hub is operating in non-beacon mode without superframe boundaries, a node may treat any time interval as a portion of EAP1 or RAP1 and employ CSMA/CA based random access to obtain a contended allocation.

In a beacon or non-beacon mode with superframes, the unscheduled bilink allocations may be 1-periodic, round-robin, or m-periodic allocations. In some embodiments, a node shall not have both 1-periodic and m-periodic allocations in the same network. In a non-beacon mode without superframes, unscheduled bilink allocations may only be round-robin for other embodiments.

FIGS. 4A-4C illustrate 1-periodic unscheduled bilink allocations in beacon or non-beacon modes with superframes 401. Each node treats the beacon periods or superframes as its wakeup beacon periods. In FIG. 4A, the assigned allocation intervals 402 are provided to the node in every superframe 401 as promised. In FIG. 4B, they are provided to the node in every superframe 401 as time-shifted allocation intervals 403 on a best-effort basis. Shifted allocation intervals 403 occur at a time that is offset compared to the time for the assigned allocation interval 402 but still with the same duration. In FIG. 4C, the assigned allocation intervals 402 are provided to the node in every superframe 401 as time shifted and reduced/expanded allocation intervals 404 on a best-effort basis. Shifted and reduced/expanded allocation intervals 404 occur at a time that is offset compared to the time for the assigned allocation interval 402 and with a reduced or expanded duration.

FIGS. 5A and 5B illustrate round-robin unscheduled bilink allocations for multiple nodes. The round-robin unscheduled bilink allocation intervals for the nodes are rotated in turn. In FIG. 5A, superframes 501 are defined by beacon periods. Each node treats all superframes 501 as its wakeup beacon periods. One or more round-robin unscheduled bilink allocation intervals 502-504 occur in each superframe 501. Each round-robin unscheduled bilink allocation interval 502-504 is granted to a different node. The nodes take turns for channel access, so that each of them can use the unscheduled bilink allocations. FIG. 5B illustrates round-robin allocations 505-507 in a non-beacon mode without superframes. The length of an allocation interval is specified in terms of a time-duration in a beacon or non-beacon mode with superframes, and of a frame count in non-beacon mode without superframes.

FIGS. 6A-6C illustrate m-periodic unscheduled bilink allocations in beacon or non-beacon mode with superframes 601. In FIG. 6A, assigned allocation intervals 602 are provided to the node in every m superframes 601 as promised, where m>1. The node treats the superframes 601 containing its tentatively assigned allocation intervals 602 as its wakeup beacon periods. In FIG. 6B, they are provided to the node in every m superframes 601 as time-shifted allocation intervals 603 on a best-effort basis. In FIG. 6C, the assigned allocation intervals 602 are provided to the node in every m superframes 601 as time-shifted and reduced/expanded allocation interval 604 in every m superframes 601 on a best-effort basis.

To obtain new unscheduled bilink allocations, a node sends a Connection Request frame to the hub. An example of a Connection Request frame according to one embodiment is described in detail below. In one embodiment, the node sets a Requested Wakeup Period field in the Connection Request frame to one for 1-periodic or round-robin unscheduled allocations and to m (wherein m>1) for m-periodic unscheduled allocations in beacon or non-beacon mode with superframes.

The node includes a Type-I Unscheduled Bilink Request information element (IE) in the frame if its hub is operating on beacon or non-beacon mode with superframes. Alternatively, the node includes a Type-II Unscheduled Bilink Request IE in the frame if its hub is operating on non-beacon mode without superframes. In either IE, Minimum Length and Allocation Length fields, or Nominal Allocation Length Requested and Maximum Allocation Length Requested fields, when present, have nonzero values.

To grant unscheduled bilink allocations (i.e., best-effort scheduled bilink allocations) requested by the node or initiated by a hub, the hub sends a Connection Assignment frame to the node. The frame includes a Type-I Unscheduled Bilink Assignment IE if the hub is operating on beacon or non-beacon mode with superframes. Alternatively, the frame includes a Type-II Unscheduled Bilink Assignment IE if the hub is operating on non-beacon mode without superframes. In either IE, Interval Start and Interval End fields, or Minimum Allocation Length Assigned, Nominal Allocation Length Assigned, and Maximum Allocation Length Assigned fields may be all set to zero to convey no unscheduled bilink allocation assignment. In other embodiments, some of these fields may be set to nonzero values to convey a tentative bilink allocation assignment.

Upon successfully sending a Connection Assignment frame granting the node unscheduled bilink allocation intervals, the hub provides the node with the unscheduled bilink allocation intervals as defined by the values of Interval Start and Interval End fields in each of the node's wakeup beacon periods or superframes, if the hub is operating in beacon or non-beacon mode with superframes.

If it is not possible to grant the unscheduled bilink allocation intervals as described above, then the hub provides the node with the unscheduled bilink allocation intervals as defined by the values of Interval Start and Interval End fields in each of the node's wakeup beacon periods or superframes but time-shifted in the same beacon period, if the hub is operating in beacon or non-beacon mode with superframes.

If it is not possible to grant the unscheduled bilink allocation intervals as described above, then the hub provides the node with the unscheduled bilink allocation intervals as defined by the values of Interval Start and Interval End fields in each of the node's wakeup beacon periods or superframes but time-shifted in the same beacon period and reduced or expanded in length, if the hub is operating in beacon or non-beacon mode with superframes.

If it is not possible to grant the unscheduled bilink allocation intervals as described above, then the hub provides the node with the unscheduled bilink allocation intervals as defined by the values of Interval Start and Interval End fields. However, instead of occurring in every beacon period, the unscheduled bilink allocation intervals reoccur across beacon periods in a round-robin manner. The unscheduled bilink allocation intervals are provided sequentially along with the unscheduled bilink allocation intervals of other assigned 1-periodic unscheduled bilink allocations of this node and other connected nodes, if the hub is operating in beacon or non-beacon mode with superframes.

Upon successfully sending a Connection Assignment frame granting the node unscheduled bilink allocation intervals, then the hub provides the node with unscheduled bilink allocation intervals as defined by the values of Minimum Allocation Length Assigned, Nominal Allocation Length Assigned, and Maximum Allocation Length Assigned fields, if the hub is operating in non-beacon mode without superframes. The unscheduled bilink allocation intervals reoccur over time in round-robin fashion. The unscheduled bilink allocation intervals are provided sequentially along with the unscheduled bilink allocation intervals of the other assigned unscheduled bilink allocations of this node and other connected nodes, if the hub is operating in non-beacon mode without superframes.

FIG. 7 illustrates frame transactions in unscheduled bilink allocation intervals 701, 702 according to one embodiment. To provide a node with an unscheduled bilink allocation interval 701, the hub may initiate a frame transaction with the node, sending a management or data type frame 703. Alternatively, at the start of a provided unscheduled bilink allocation interval 702, the hub may send to the node a Poll or T-Poll frame 704 granting a polled allocation 705 for the node to initiate one or more frame transactions 706, 707 with the hub. The recipient—i.e. the node or the hub—shall be ready to receive the frames transmitted by the sender and to return appropriate frames during the provided unscheduled bilink allocation intervals 701.

Following a frame transaction 703 initiated by a hub or a polled allocation 705 granted by a hub in an unscheduled bilink allocation interval 701, 702, the hub may initiate one or more frame transactions 708, 709, or 710, 711, 712 with the node. Alternatively, the hub may send another Poll or T-Poll frame 713, 714 to the node granting another polled allocation 715, 716 for the node to initiate one or more frame transactions therein. The hub initiates an additional frame transaction 708, 710, 711, 712 or sends another Poll or T-Poll frame a short inter-frame spacing (SIFS) after the end of the preceding frame transaction 703, 710 or immediately after the end of the preceding polled allocation interval 705. The node shall not initiate a frame transaction until it receives a Poll or T-Poll frame 704, 713, 714 in an unscheduled bilink allocation interval 701, 702. The hub shall not continue transmitting to the node in a provided unscheduled bilink allocation interval if the hub has sent a predetermined number (mUnscheduledNoResponseLimit) of consecutive frames to the node, where each frame requires a response but no response was received from the node. In this situation, the node has effectively relinquishing the allocation interval, which is reclaimed by the hub.

Frame transactions with the hub, including any acknowledgment frames if required, must fit in each provided unscheduled bilink allocation interval 701, 702 while accounting for an appropriate guard time (GT).

A node may modify an existing unscheduled bilink allocation by sending another Connection Request frame that specifies new requirements for the allocation, which is identified using an Allocation ID value. The hub treats the Connection Request as a new one request, except that it sets a Connection Change Indicator field in a corresponding Connection Assignment frame with reference to the last Connection Assignment frame that the hub sent to the node. In particular, if the hub rejects the modifications but maintains the existing assignment, the hub responds with a Connection Assignment frame having a Connection Change Indicator field set to zero and with the other fields having the respective values contained in the last Connection Assignment frame that was sent to the node.

In one embodiment, a hub may—but preferably does not where possible—modify unscheduled bilink allocations of a node on its own by sending an unsolicited Connection Assignment frame to the node. The unsolicited Connection Assignment frame specifies the new tentative assignments of those allocations and the Connection Change Indicator field in the frame is set with reference to the last Connection Assignment frame sent by the hub to the same node.

A node or a hub shall treat an existing unscheduled bilink allocation to have been aborted after failing to receive any frame in a predetermined number (mUnscheduledAllocationAborted) of allocation intervals or in a predetermined duration. For example, if the hub is operating in beacon or non-beacon mode with superframes, then an existing unscheduled bilink allocation is considered to have been aborted if no frame is received in the last mUnscheduledAllocationAborted assigned allocation intervals of the allocation. If the hub is operating in non-beacon mode without superframes, then an existing unscheduled bilink allocation is considered to have been aborted if no frame is received in the last mUnscheduledAllocationAborted seconds. Subsequently, the hub may reclaim the unscheduled bilink allocation by not providing the node with the corresponding unscheduled bilink allocation intervals.

A node or a hub should transmit at least one frame that requires an immediate return of a frame in every allocation interval of a provided unscheduled bilink allocation so as to reduce the chance of experiencing an abortion of the unscheduled bilink allocation. The return frame may be an I-Ack (immediate acknowledgment) or a B-Ack (block acknowledgment) frame, for example.

A node and a hub may start a new unscheduled bilink allocation procedure to reinstate lost unscheduled bilink allocations or to obtain their replacements.

A node may end unscheduled bilink allocations at any time by sending a modified Connection Request frame that contains Allocation Request fields with Allocation ID fields identifying those allocations, and with corresponding Minimum Length and Allocation Length fields set to zero, or with Minimum Allocation Length Requested, Nominal Allocation Length Requested, and Maximum Allocation Length Requested fields set to zero.

In one embodiment, a hub may at any time—but should not where possible—end any unscheduled bilink allocations of a node by sending the node a modified Connection Assignment frame that contains Allocation Assignment fields with the Allocation ID fields identifying those allocations, and with the Interval Start and Interval End fields set to zero, or with the Minimum Allocation Length Assigned, Nominal Allocation Length Assigned, and Maximum Allocation Length Assigned fields set to zero.

FIG. 8 illustrates a format of a Frame Payload 800 in a Connection Request frame transmitted by a node to request creation or modification of a connection with a hub according to one embodiment. Recipient Address field 801 and Sender Address field 802 are respectively set to the MAC address of the recipient and the sender of the current frame. MAC Capability field 803 and PHY Capability field 804 indicate the capability of the node to support certain MAC and PHY functions, respectively.

Change Indicator 805 indicates that certain fields in the current frame have been newly provided or changed in value since their last exchange between the sender and the recipient. Requested Ack Data Rates 806 defines the data rates requested for use to send I-Ack and B-Ack data frames between the sender and recipient of the current frame in acknowledgment of their exchanged management or data type frames.

Requested Wakeup Phase field 807 is set to the sequence number of the next beacon period (superframe) in which the node plans to wake up for frame reception and transmission. Requested Wakeup Period field 808 is set to the length, in units of beacon periods, between the start of successive wakeup beacon periods in which the node plans to wake up for reception and transmission. Max Sync Interval/Clock PPM 809 is used if the node requires centralized guard time provisioning as indicated in the MAC Capability field of the current frame.

Uplink Request IE 810 is used to request, using allocation slot-based requirements, for the creation or modification of one or more scheduled uplink allocations in beacon or non-beacon mode with superframes. Downlink Request IE 811 is used to request, using allocation slot-based requirements, for the creation or modification of one or more scheduled downlink allocations in beacon or non-beacon mode with superframes. Bilink Request IE 812 is used to request, using allocation slot-based requirements, for the creation or modification of one or more scheduled bilink allocations in beacon or non-beacon mode with superframes.

Unscheduled Bilink Request IE 813 is either a Type-I Unscheduled Bilink Request IE or a Type-II Unscheduled Bilink Request IE. A Type-I Unscheduled Bilink Request IE is used to request, using allocation slot-based requirements, for the creation or modification of one or more unscheduled bilink allocations in beacon or non-beacon mode with superframes. A Type-II Unscheduled Bilink Request IE is used to request, using frame count-based requirements, for the creation or modification of one or more unscheduled bilink allocations in non-beacon mode without superframes.

Former Hub Address is set to the MAC Address of the last hub with which the node was connected. Application Specific IE 815 is contained in some management type frames to convey application-specific information.

FIG. 9 illustrates a format of a Frame Payload in a Connection Assignment frame transmitted by a hub to respond to a connection request or to initiate or change a connection assignment according to one embodiment. Recipient Address 901 and Sender Address 902 are respectively set to the MAC address of the recipient and the sender of the current frame. Mode/Status 903 identifies the access mode of the hub and the status of the connection assignment. Current Superframe Number 904 is set to the sequence number of the current superframe or beacon period.

Earliest RAP1 End field 905 is set to E>0 such that random access phase 1 (RAP1) is guaranteed not to end before the start of the allocation slot numbered E in any beacon period (superframe). EAP2 Start field 906 is set to the number of the allocation slot whose start time starts exclusive access phase 2 (EAP2). MAC Capability field 907 and PHY Capability field 908 indicate the capability of the hub to support certain MAC and PHY functions, respectively. Change Indicator 909 indicates that certain fields in the current frame have been newly provided or changed in value since their last exchange between the sender and the recipient.

Assigned Ack Data Rates 910 defines the data rates assigned for use to send I-Ack and B-Ack data frames between the sender and recipient of the current frame in acknowledgment of their exchanged management or data type frames. Assigned Wakeup Phase field 911 is set to the sequence number of the next beacon period (superframe) in which the recipient node needs to wake up for frame reception and transmission. Assigned Wakeup Period field 912 is set to the length, in units of beacon periods (superframes), between the start of successive wakeup beacon periods (superframes) in which the recipient node needs to wake up for reception and transmission, starting from the one indicated in the preceding Assigned Wakeup Phase field 911.

Superframe Parameters IE 913 is formatted to convey the values of chosen superframe (beacon period) operation parameters. Uplink Assignment IE 914 is used to assign or reassign one or more allocation slot-based scheduled uplink allocations to the addressed node in beacon or non-beacon mode with superframes. Downlink Assignment IE 915 is used to assign one or more allocation slot based scheduled downlink allocations to the addressed node in beacon or non-beacon mode with superframes. Bilink Assignment IE 916 is used to assign one or more allocation slot based scheduled Bilink allocations to the addressed node in beacon or non-beacon mode with superframes.

Unscheduled Bilink Assignment IE 917 is either a Type-I Unscheduled Bilink Assignment IE or a Type-II Unscheduled Bilink Assignment IE. A Type-I Unscheduled Bilink Assignment IE is optionally contained in Connection Assignment frames to assign or reassign one or more allocation slot-based unscheduled bilink allocations to the addressed node in beacon or non-beacon mode with superframes. A Type-II Unscheduled Bilink Assignment IE is optionally contained in Connection Assignment frames to assign or reassign one or more frame-count based unscheduled bilink allocations to the addressed node in non-beacon mode without superframes.

Channel Order IE 918 is used to indicate some or all channels included in the operating channel selection in the operating frequency band that has no more than 15 operating channels and the order in which the operating channel is selected. Application Specific IE 919 is contained in some management type frames to convey application-specific information.

FIG. 10 is a block diagram illustrating a network topology employing embodiments of the invention. Nodes 1001, 1002 and hubs 1003, 1004 are organized into logical sets, referred to as networks. In the illustrated embodiment, there is only one hub in a network, but the number of nodes in a network may vary. For example, network 1 1005 comprises hub 1003 and plurality of nodes 1001, and network 2 1006 comprises hub 1004 and plurality of nodes 1002. In one embodiment, data is exchanged within the same network using unscheduled access described herein.

FIG. 11 is a block diagram of an exemplary embodiment of a device 1100 implementing embodiments of the invention. Device 1100 may be used as a node 1001, 1002 and/or a hub 1003, 1004 in FIG. 10. In one embodiment, device 1100 is a hub, gateway, or controller controlling and communicating with one or more nodes or with other hubs. In another embodiment, device 1100 is a low-power wireless node operating on, in, or around a human or non-human body and communicating with a hub or another node to service one or more applications, such as medical services, consumer electronics, and personal entertainment.

Processor 1101 processes data exchanged with other nodes or hubs via transceiver 1102 and antenna 1103 and/or via wired interface 1104 coupled to Internet or another network 1105. Processor 1101 may be a software, firmware, or hardware based device or a combination thereof. Processor 1101 may also generate and process messages sent to, and received from, another device, such as using unscheduled access described herein.

Memory 1106 may be used to store MAC header and frame payload of beacon, B2, and other frames. Memory 1106 may also be used to store computer program instructions, software and firmware used by processor 1101. It will be understood that memory 1106 may be any applicable storage device, such as a fixed or removable RAM, ROM, flash memory, or disc drive that is separate from or integral to processor 1101.

Device 1100 may be coupled to other devices, such as user interface 1107, sensors 1108, or other devices or equipment 1109. Device 1100 may be adapted to operate in a body area network either as a node or as a hub controlling a plurality of nodes and coordinating with other hubs for coexistence. Sensors 1108 may be used, for example, to monitor vital patient data, such as body temperature, heart rate, and respiration. Equipment 1109 may be, for example, a monitor or other device that receives and analyzes signals, such as a patient's temperature, heart rate, and respiration, from another node. Alternatively, equipment 1109 may be a device for providing a service to a patient, such as controlling an intravenous drip, respirator, or pacemaker.

It will be understood that the networks 1005, 1006 in FIG. 10 and the device 1100 in FIG. 11 are presented for illustrative purposes only and are not intended to limit the scope of the systems or devices that are capable of employing the unscheduled access procedure described herein.

FIGS. 12A and 12B illustrate the format of a Type-I Unscheduled Bilink Request IE 1200 according to one embodiment. Type-I Unscheduled Bilink Request IE 1200 is optionally contained in Connection Request frames to request, using allocation slot-based requirements, for creation or modification of one or more unscheduled bilink allocations in beacon or non-beacon mode with superframes.

Type-I Unscheduled Bilink Request IE 1200 comprises element ID 1201, length field 1202, and a number of Allocation Request fields 1203. Length field 1202 is equal to 6N, where N is the number of Allocation Request fields 1203 contained in Type-I Unscheduled Bilink Request IE 1200.

Each Allocation Request 1203 is formatted as shown in FIG. 12B to describe the allocation slot-based requirements of an allocation for servicing the data belonging to a given user priority. Allocation ID 1204 identifies an allocation requested by the node and is comprised of Frame Subtype 1205 and User Priority 1206 fields. Frame Subtype field 1205 is set to the frame subtype of the data type frames to be transferred in the requested allocation. User Priority field 1206 is set to the user priority of the frame payloads to be transferred in the requested allocation. Additional data may be included in reserved field 1207.

Maximum Gap field 1208 is set to the largest length, in units of allocation slots, between the end of an allocation interval and the start of the next allocation interval of this requested allocation in the same beacon period (superframe) or across beacon periods (superframes), if the Requested Wakeup Period field in the current frame has a value of one. It is reserved otherwise. Minimum Gap field 1209 is set to the smallest length, in units of allocation slots, between the end of an allocation interval and the start of the next allocation interval of this requested allocation in the same beacon period (superframe) or across beacon periods (superframes).

Minimum Length field 1210 is set to the smallest length, in units of allocation slots, of any of the allocation intervals of this requested allocation. Allocation Length field 1211 is set to the overall length, in units of allocation slots, of the allocation intervals of this requested allocation in each wakeup beacon period (superframe) of this node. Scaling Down Factor field 1212 specifies the smallest overall length, in units of allocation slots, of the allocation intervals this node is willing to accept for this requested allocation in each of its wakeup beacon periods (superframes). Scaling Up Factor field 1213 specifies the largest overall length, in units of allocation slots, of the allocation intervals this node is willing to accept for this requested allocation in each of its wakeup beacon periods (superframes).

FIGS. 13A and 13B illustrate the format of a Type-II Unscheduled Bilink Request IE 1300 according to one embodiment. Type-II Unscheduled Allocation Request 1300 is optionally contained in Connection Request frames to request, using frame count-based requirements, for creation or modification of one or more unscheduled bilink allocations in non-beacon mode without superframes.

Type-II Unscheduled Bilink Request IE 1300 comprises element ID 1301, length field 1302, and a number of Type-II Unscheduled Allocation Request fields 1303. Length field 1302 is equal to 4M, where M is the number of Type-II Unscheduled Allocation Request fields 1303 contained in IE Type-II Unscheduled Bilink Request IE 1300.

Each Type-II Unscheduled Allocation Request field 1303 is formatted as shown in FIG. 13B to describe the frame count-based requirements of an allocation for servicing the data belonging to a given user priority. Allocation ID 1304 identifies an allocation requested by the node and is comprised of Frame Subtype 1305 and User Priority 1306 fields. Frame Subtype field 1305 is set to the frame subtype of the data type frames to be transferred in the requested allocation. User Priority field 1306 is set to the user priority of the frame payloads to be transferred in the requested allocation. Additional data may be included in reserved field 1307.

Minimum Allocation Length Requested field 1308 is set to the minimum number of non-control type frames to be transferred between the node and the hub in each allocation interval of this requested allocation subject to round-robin scheduling policy, whereby each allocation has one allocation interval among the allocation intervals of other allocations per round-robin cycle. Nominal Allocation Length Requested field 1309 is set to the expected number of non-control type frames to be transferred between the node and the hub in each allocation interval of this requested allocation subject to round-robin scheduling policy. Maximum Allocation Length Requested field 1310 is set to the maximum number of non-control type frames to be transferred between the node and the hub in each allocation interval of this requested allocation subject to round-robin scheduling policy.

FIGS. 14A and 14B illustrate the format of a Type-I Unscheduled Bilink Assignment IE 1400 according to one embodiment. Type-I Unscheduled Bilink Assignment IE 1400 is optionally contained in Connection Assignment frames to assign or reassign one or more allocation slot-based unscheduled bilink allocations to the addressed node in beacon or non-beacon mode with superframes.

Type-I Unscheduled Bilink Assignment IE 1400 comprises Element ID 1401, length field 1402, and a number of Allocation Assignment fields 1403. Length field 1402 is equal to 3J, where J is the number of Allocation Assignment fields 1403 contained in Type-I Unscheduled Bilink Assignment IE 1400.

Each Allocation Assignment 1403 is formatted as shown in FIG. 14B to specify an allocation interval of an assigned allocation for the data belonging to a given user priority. One or more Allocation Assignment fields 1403 are included to specify an allocation. Additional Allocation Assignment fields 1403 may be included to specify additional allocations. Allocation ID 1404 identifies an allocation being assigned or reassigned to the node and is comprised of Frame Subtype 1405 and User Priority 1406 fields. Frame Subtype field 1405 is set to the frame subtype of the data type frames to be transferred in the assigned allocation. User Priority field 1406 is set to the user priority of the frame payloads to be transferred in the assigned allocation. Additional data may be included in reserved field 1407.

The values of the Interval Start 1408 and Interval End 1409 fields contained in Type-I Unscheduled Bilink Assignment IE 1400 specify the locations and lengths of the allocation intervals. The Interval Start 1408 and Interval End 1409 are assigned on a tentative basis and subject to change within the wakeup beacon period (superframe) of the node. If the Assigned Wakeup Period field contained in the current frame is set to one, the availability of allocation intervals is further subject to round-robin scheduling policy, i.e., each allocation has one allocation interval among the allocation intervals of all allocations per round-robin cycle.

FIGS. 15A and 15B illustrate the format of a Type-II Unscheduled Bilink Assignment IE 1500 according to one embodiment. Type-II Unscheduled Bilink Assignment 1500 is optionally contained in Connection Assignment frames to assign or reassign one or more frame count-based unscheduled bilink allocations to the addressed node in non-beacon mode without superframes.

Type-II Unscheduled Bilink Assignment IE 1500 comprises element ID 1501, length field 1502, and a number of Type-II Unscheduled Allocation Assignment fields 1503. Length field 1502 is equal to 4L, where L is the number of Type-II Unscheduled Allocation Assignment fields 1503 contained in the Type-II Unscheduled Bilink Request IE 1500.

Allocation ID 1504 identifies the allocation being assigned or reassigned to the node. It is set to the Allocation ID 1504 used to identify the allocation requested earlier by the node. Frame Subtype field 1505 is set to the frame subtype of the data type frames to be transferred in this assigned allocation. User Priority field 1506 is set to the user priority of the frame payloads to be transferred in this assigned allocation. Additional data may be included in reserved field 1507.

Minimum Allocation Length Assigned field 1507 is set to the minimum number of data type frames to be transferred between the node and the hub in each allocation interval of this assigned allocation subject to round-robin scheduling policy, whereby each allocation has one allocation interval per round-robin cycle. Nominal Allocation Length Assigned field 1508 is set to the expected number of data type frames to be transferred between the node and the hub in each allocation interval of this assigned allocation subject to round-robin scheduling policy, whereby each allocation has one allocation interval per round-robin cycle. Maximum Allocation Length Assigned field 1509 is set to the maximum number of data type frames to be transferred between the node and the hub in each allocation interval of this assigned allocation subject to round-robin scheduling policy, whereby each allocation has one allocation interval per round-robin cycle.

FIG. 16 is a flowchart illustrating a process for performing a best-effort scheduled access by a node according to one embodiment. In step 1601, an unscheduled bilink request is sent from a node to a hub. The request specifies the node's unscheduled bilink allocation requirements. In step 1602, an unscheduled bilink assignment is received at the node from the hub. The assignment specifies a tentative assignment of an unscheduled bilink allocation to the node. In step 1603, the node monitors transmissions from the hub on a same channel where the request and assignment were exchanged, during each of its wakeup beacon periods if the hub is operating on beacon or non-beacon mode with superframes or during any time if the hub is operating on non-beacon mode without superframes, in preparation for being provided by the hub with the bilink allocation intervals of the bilink allocation. In step 1604, a first frame is received from the hub at the node for each bilink allocation interval of the bilink allocation. The first frame starts a bilink allocation interval provided to the node, with a frame transaction initiated by the hub with the node, or with a Poll or T-Poll frame conveying a polled allocation granted by the hub to the node. In step 1605, an acknowledgment frame, if required, is sent from the node to the hub to complete a frame transaction initiated with the first frame by the hub, or one or more frame transactions are initiated by the node with the hub during the polled allocation. In step 1606, another frame is received from the hub at the node in the provided allocation interval, if any, and a response is sent from the node to the hub as described in steps 1604 and 1605. These steps are repeated until the end of the provided bilink allocation interval is reached.

FIG. 17 is a flowchart illustrating a process for performing a best-effort scheduled access by a hub according to one embodiment. In step 1701, an unscheduled bilink request is received from a node at a hub. The request specifies the node's unscheduled bilink allocation requirements. In step 1702, an unscheduled bilink assignment is sent to the node from the hub. The assignment specifies a tentative assignment of an unscheduled bilink allocation to the node. In step 1703, the hub monitors bandwidth availability on a same channel where the request and assignment were exchanged, in preparation for providing to the node with the bilink allocation intervals of the bilink allocation. In step 1704, a first frame is sent from the hub to the node for each bilink allocation interval of the bilink allocation. The first frame starts a bilink allocation interval provided to the node, with a frame transaction initiated by the hub with the node, or with a Poll or T-Poll frame conveying a polled allocation granted by the hub to the node. In step 1705, an acknowledgment frame, if required, is received from the node at the hub to complete a frame transaction initiated with the first frame by the hub, or acknowledgment frames, if required, are sent from the hub to the node to complete frame transactions initiated by the node during the polled allocation. In step 1706, another frame is sent from the hub to the node in the provided allocation interval, if any, and a next expected frame is received from the node at the hub as described in steps 1704 and 1705. These steps are repeated until the end of the provided bilink allocation interval is reached.

It will be understood that steps 1601-1606 of the process illustrated in FIG. 16 and steps 1701-1706 of the process illustrated in FIG. 17 may be executed simultaneously and/or sequentially. It will be further understood that each step may be performed in any order and may be performed once or repetitiously.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

The software code segments may be stored in any volatile or non-volatile storage device, such as a hard drive, flash memory, solid state memory, optical disk, CD, DVD, computer program product, or other memory device, that provides computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method, comprising:
   sending a bilink request from a first device to a second device, the bilink request specifying the first device's bilink allocation requirements,
   wherein a bilink is a communication link that allows for transfer of management and data traffic from both:
   a.) a hub to a node; and
   b.) a node to a hub;
   receiving a bilink assignment at the first device from the second device, the bilink assignment specifying a tentative assignment of a bilink allocation to the first device, wherein the tentative assignment of the bilink allocation will be available if the network of the hub still has enough bandwidth when the scheduled time arrives and will be shifted or reduced if the network of the hub does not have enough bandwidth when the scheduled time arrives;
   monitoring transmissions from the second device on a channel at the first device in preparation for being provided by the second device with bilink allocation intervals of the bilink allocation; and
   receiving a first frame from the second device at the first device for each bilink allocation interval of the bilink allocation, the first frame starting a bilink allocation interval provided to the first device.

2. The method of claim 1, wherein the first frame starting a bilink allocation interval is sent by the second device to initiate a frame transaction with the first device in the provided bilink allocation interval.

3. The method of claim 1, wherein the first frame starting a bilink allocation interval is a Poll or Timed Poll (T-Poll) frame sent by the second device to grant a polled allocation to the first device, the method further comprising:
   initiating one or more frame transactions by the first device with the second device during the polled allocation.

4. The method of claim 1, further comprising:
   receiving a second frame from the second device at the first device; and
   sending a response from the first device to the second device during the provided bilink allocation interval.

5. The method of claim 4, wherein the second frame is sent by the second device to initiate another frame transaction with the first device in the provided bilink allocation interval.

6. The method of claim 4, wherein the second frame is a Poll or Timed Poll (T-Poll) frame sent by the second device to grant an additional polled allocation to the first device, the method further comprising:
   initiating one or more frame transactions by the first device with the second device during the additional polled allocation.

7. The method of claim 1, wherein the first frame starting a bilink allocation interval modifies a bilink allocation interval of the tentatively assigned bilink allocation.

8. The method of claim 7, wherein the bilink allocation interval is modified by changing its start time but not its duration.

9. The method of claim 7, wherein the bilink allocation interval is modified by changing its start time and its duration.

10. The method of claim 1, wherein the bilink assignment specifies a tentative assignment of a bilink allocation that comprises one or more bilink allocation intervals in every superframe.

11. The method of claim 1, wherein the bilink assignment specifies a tentative assignment of a bilink allocation that comprises one or more bilink allocation intervals in every $m^{th}$ superframe, where m>1.

12. The method of claim 1, wherein the bilink assignment specifies a tentative assignment of a bilink allocation that comprises one or more bilink allocation intervals in a round-robin fashion over time.

13. A device, comprising:
    a circuit for sending signals to and receiving signals from another device;
    a memory for storing best-effort scheduled access information for the device and for the other device; and
    a processor adapted to perform operations on the signals sent to or received from the other device, the processor operating to:
    send a bilink request to the other device, the bilink request specifying the device's bilink allocation requirements;
    wherein a bilink is communication link that allows for transfer of management and data traffic from both:
    a.) a hub to a node; and
    b.) a node to a hub;
    receive a bilink assignment from the other device, the bilink assignment specifying a tentative assignment of a bilink allocation to the device, wherein the tentative assignment of the bilink allocation will be available if the network of the hub still has enough bandwidth when the scheduled time arrives and will be shifted or reduced if the network of the hub does not have enough bandwidth when the scheduled time arrives;
    monitor transmissions from the other device on a channel in preparation for being provided by the other device with bilink allocation intervals of the bilink allocation; and
    receive a first frame from the other device for each bilink allocation interval of the allocation, the first frame starting a bilink allocation interval provided to the first device.

14. The device of claim 13, wherein the first frame starting a bilink allocation interval is sent by the other device to initiate a frame transaction with the device in the provided bilink allocation interval.

15. The device of claim 13, wherein the first frame starting a bilink allocation interval is a Poll or Timed Poll (T-Poll) frame sent by the other device to grant a polled allocation to the device, the processor further operating to:
   initiate one or more frame transactions with the other device during the polled allocation.

16. The device of claim 13, the processor further operating to:
   receive a second frame from the other device; and
   send a response to the other device during the provided bilink allocation interval.

17. The device of claim 16, wherein the second frame is sent by the other device to initiate another frame transaction with the device in the provided bilink allocation interval.

18. The device of claim 16, wherein the second frame is a Poll or Timed Poll (T-Poll) frame sent by the other device to grant an additional polled allocation to the device, the processor further operating to:
   initiate one or more frame transactions with the other device during the additional polled allocation.

19. The device of claim 13, wherein the first frame starting a bilink allocation interval modifies an allocation interval of the tentatively assigned bilink allocation.

20. The device of claim 19, wherein the bilink allocation interval is modified by changing its start time but not its duration.

21. The device of claim 19, wherein the bilink allocation interval is modified by changing its start time and its duration.

22. The device of claim 13, wherein the bilink assignment specifies a tentative assignment of a bilink allocation that comprises one or more bilink allocation intervals in every superframe.

23. The device of claim 13, wherein the bilink assignment specifies a tentative assignment of a bilink allocation that comprises one or more bilink allocation intervals in every $m^{th}$ superframe, where m>1.

24. The device of claim 13, wherein the bilink assignment specifies a tentative assignment of a bilink allocation that comprises one or more bilink allocation intervals in a round-robin fashion over time.

25. A method, comprising:
   receiving a bilink request from a first device at a second device, the bilink request specifying the first device's bilink allocation requirements;
   wherein a bilink is communication link that allows for transfer of management and data traffic from both:
      a.) a hub to a node; and
      b.) a node to a hub;
   sending a bilink assignment to the first device from the second device, the bilink assignment specifying a tentative assignment of a bilink allocation to the first device, wherein the tentative assignment of the bilink allocation will be available if the network of the hub still has enough bandwidth when the scheduled time arrives and will be shifted or reduced if the network of the hub does not have enough bandwidth when the scheduled time arrives;
   monitoring bandwidth availability on a channel at the second device in preparation for providing to the first device with bilink allocation intervals of the bilink allocation; and
   sending a first frame from the second device to the first device for each bilink allocation interval of the bilink allocation, the first frame starting a bilink allocation interval provided to the first device.

26. The method of claim 25, wherein the first frame starting a bilink allocation interval is sent by the second device to initiate a frame transaction with the first device in the provided bilink allocation interval.

27. The method of claim 25, wherein the first frame starting a bilink allocation interval is a Poll or Timed Poll (T-Poll) frame sent by the second device to grant a polled allocation to the first device, the method further comprising:
   responding at the second device to frame transactions initiated by the first device during the polled allocation.

28. The method of claim 25, wherein the first frame starting a bilink allocation interval modifies a bilink allocation interval of the tentatively assigned bilink allocation.

29. The method of claim 28, wherein the bilink allocation interval is modified by changing its start time but not its duration.

30. The method of claim 28, wherein the bilink allocation interval is modified by changing its start time and its duration.

31. The method of claim 25, wherein the bilink assignment specifies a tentative assignment of a bilink allocation that comprises one or more bilink allocation intervals in every superframe.

32. The method of claim 25, wherein the bilink assignment specifies a tentative assignment of a bilink allocation that comprises one or more bilink allocation intervals in every $m^{th}$ superframe, where m>1.

33. The method of claim 25, wherein the bilink assignment specifies a tentative assignment of a bilink allocation that comprises one or more bilink allocation intervals in a round-robin fashion over time.

34. A device, comprising:
   a circuit for sending signals to and receiving signals from another device;
   a memory for storing best-effort scheduled access information for the device and for the other device; and
   a processor adapted to perform operations on the signals sent to or received from the other device, the processor operating to:
   receive a bilink request from the other device, the bilink request specifying the other device's bilink allocation requirements;
   wherein a bilink is communication link that allows for transfer of management and data traffic from both:
      a.) a hub to a node; and
      b.) a node to a hub;
   send a bilink assignment to the other device, the bilink assignment specifying a tentative assignment of a bilink allocation to the other device, wherein the tentative assignment of the bilink allocation will be available if the network of the hub still has enough bandwidth when the scheduled time arrives and will be shifted or reduced if the network of the hub does not have enough bandwidth when the scheduled time arrives;
   monitoring bandwidth availability on a channel in preparation for providing to the other device with bilink allocation intervals of the bilink allocation; and
   send a first frame to the other device for each bilink allocation interval of the bilink allocation, the first frame starting a bilink allocation interval provided to the other device.

35. The device of claim 34, wherein the first frame starting a bilink allocation interval is sent to initiate a frame transaction with the other device in the provided bilink allocation interval.

36. The device of claim 34, wherein the first frame starting a bilink allocation interval is a Poll frame or Timed Poll (T-Poll) frame sent to grant a polled allocation to the other device, the processor further operating to:

respond to frame transactions initiated by the other device during the polled allocation.

* * * * *